United States Patent
Naya et al.

(10) Patent No.: US 10,431,196 B2
(45) Date of Patent: Oct. 1, 2019

(54) SOUNDPROOF STRUCTURE AND ADJUSTMENT METHOD OF SOUNDPROOF STRUCTURE

(71) Applicant: FUJIFILM Corporation, Tokyo (JP)

(72) Inventors: Masayuki Naya, Ashigarakami-gun (JP); Shinya Hakuta, Ashigarakami-gun (JP); Shogo Yamazoe, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/124,821

(22) Filed: Sep. 7, 2018

(65) Prior Publication Data

US 2019/0005938 A1 Jan. 3, 2019

Related U.S. Application Data

(63) Continuation of application No. PCT/JP2017/005034, filed on Feb. 13, 2017.

(30) Foreign Application Priority Data

Mar. 24, 2016 (JP) .................................. 2016-060271

(51) Int. Cl.
*G10K 11/16* (2006.01)
*E04B 1/82* (2006.01)
(Continued)

(52) U.S. Cl.
CPC ............... *G10K 11/162* (2013.01); *B32B 5/26* (2013.01); *B32B 37/1292* (2013.01);
(Continued)

(58) Field of Classification Search
CPC ........ G10K 11/16; G10K 11/172; E04B 1/82; E04B 1/8227; E04B 1/8409; E04B 1/99;
(Continued)

(56) References Cited

U.S. PATENT DOCUMENTS 2,308,827 A * 1/1943 Richard .................... E04B 1/86
181/292
2,645,301 A * 7/1953 De Vries .................. H04R 1/22
181/290
(Continued)

FOREIGN PATENT DOCUMENTS

JP 10-222170 A 8/1998
JP 2005-250474 A 9/2005
(Continued)

OTHER PUBLICATIONS

International Search Report, issued in PCT/JP2017/005034, dated Apr. 18, 2017.
(Continued)

*Primary Examiner* — Edgardo San Martin
(74) *Attorney, Agent, or Firm* — Birch, Stewart, Kolasch & Birch, LLP

(57) ABSTRACT

There is provided a soundproof structure that can selectively block sound having a specific frequency emitted from equipment, automobiles, and general households and can change the cutoff frequency of the sound in accordance with a change in the frequency of sound to be blocked. The above problem is solved by providing a laminated film, in which two or more films each including one or more holes drilled therein are laminated, and two rigid frames, which fix the laminated film so as to be interposed from both sides of the laminated film, and making at least parts of the one or more holes in the respective films of the laminated film overlap each other.

21 Claims, 8 Drawing Sheets

(51) Int. Cl.
*G10K 11/162* (2006.01)
*B60R 13/08* (2006.01)
*B32B 5/26* (2006.01)
*B32B 37/12* (2006.01)
*E04B 1/84* (2006.01)
*E04B 1/86* (2006.01)
*E04B 1/99* (2006.01)
*G10K 11/172* (2006.01)

(52) U.S. Cl.
CPC ............ *B60R 13/08* (2013.01); *E04B 1/8409* (2013.01); *E04B 1/86* (2013.01); *E04B 1/994* (2013.01); *G10K 11/172* (2013.01); *B32B 2307/102* (2013.01); *E04B 2001/8433* (2013.01); *E04B 2001/8447* (2013.01)

(58) Field of Classification Search
CPC ............ E04B 1/994; E04B 2001/8433; E04B 2001/8438; E04B 2001/8452; B32B 2307/10; B32B 2307/102
See application file for complete search history.

(56) References Cited

U.S. PATENT DOCUMENTS

| | | | | |
|---|---|---|---|---|
| 2,656,004 | A * | 10/1953 | Olson | H04R 1/22 181/157 |
| 3,253,676 | A * | 5/1966 | Bottum | F01N 1/165 181/241 |
| 3,534,829 | A * | 10/1970 | Schneider | E04B 1/86 181/290 |
| 4,531,562 | A * | 7/1985 | Swanson | E06B 9/24 160/26 |
| 5,241,512 | A * | 8/1993 | Argy | G10K 11/172 181/198 |
| 5,930,371 | A * | 7/1999 | Cheng | F01N 1/023 381/71.5 |
| 6,811,372 | B1 * | 11/2004 | Emborg | F02C 7/045 181/292 |
| 7,395,898 | B2 | 7/2008 | Yang et al. | |
| 7,891,464 | B2 * | 2/2011 | Tang | F04D 25/08 181/224 |
| 8,485,310 | B2 * | 7/2013 | Tanabe | G10K 11/172 181/224 |
| 8,573,356 | B1 * | 11/2013 | Perdue | E04B 1/994 181/284 |
| 8,689,931 | B2 * | 4/2014 | Wilmink | A61F 11/08 181/135 |
| 8,739,927 | B2 * | 6/2014 | Kang | E04B 1/86 181/293 |
| 9,708,811 | B2 * | 7/2017 | Hsieh | E04B 1/8209 |
| 9,728,177 | B2 * | 8/2017 | Mekid | G10K 11/002 |
| 10,062,369 | B2 * | 8/2018 | Mekid | G10K 11/002 |
| 2005/0161280 | A1 * | 7/2005 | Furuya | F01N 1/003 181/225 |
| 2008/0314679 | A1 * | 12/2008 | Rowe | F01N 1/16 181/241 |
| 2017/0198474 | A1 * | 7/2017 | Graves | G05B 19/0426 |
| 2018/0114516 | A1 * | 4/2018 | Hakuta | E04B 1/86 |
| 2018/0122352 | A1 * | 5/2018 | Hakuta | G10K 11/16 |

FOREIGN PATENT DOCUMENTS

| | | |
|---|---|---|
| JP | 2005-345836 A | 12/2005 |
| JP | 2011-39356 A | 2/2011 |
| JP | 4832245 B2 | 12/2011 |
| WO | WO-2008007447 A1 * | 1/2008 ............ E01F 8/0064 |
| WO | WO-2018037959 A1 * | 3/2018 ............ G10K 11/16 |

OTHER PUBLICATIONS

Written Opinion of the International Searching Authority, issued in PCT/JP2017/005034, dated Apr. 18, 2017.

* cited by examiner

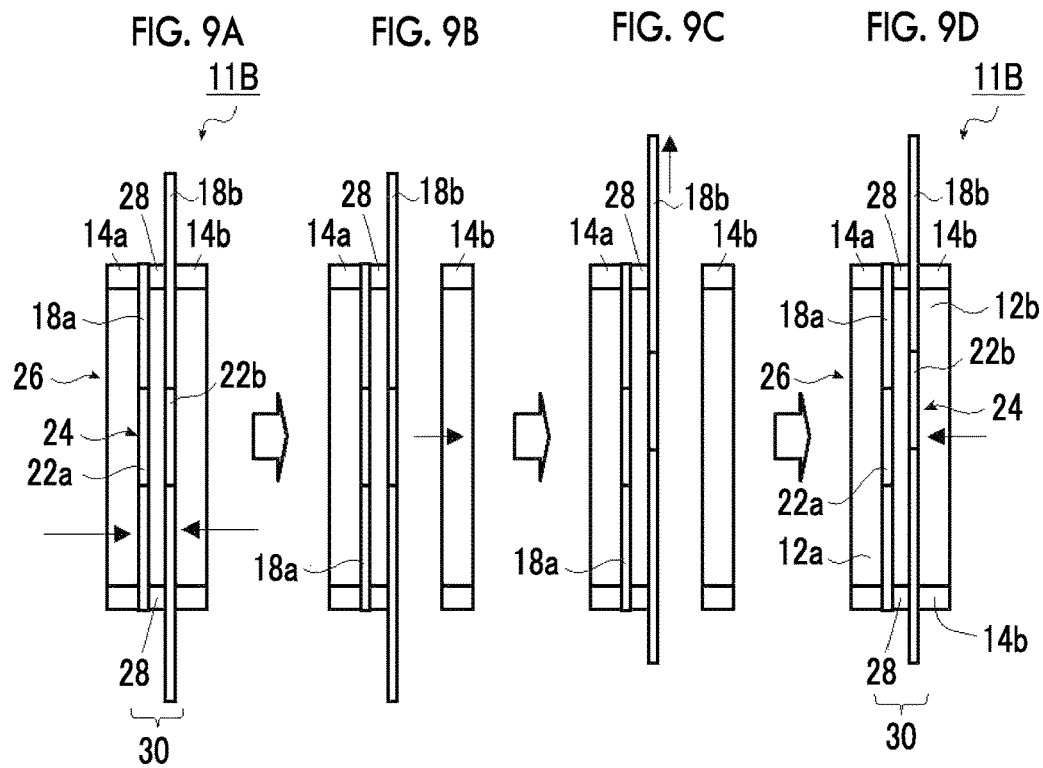
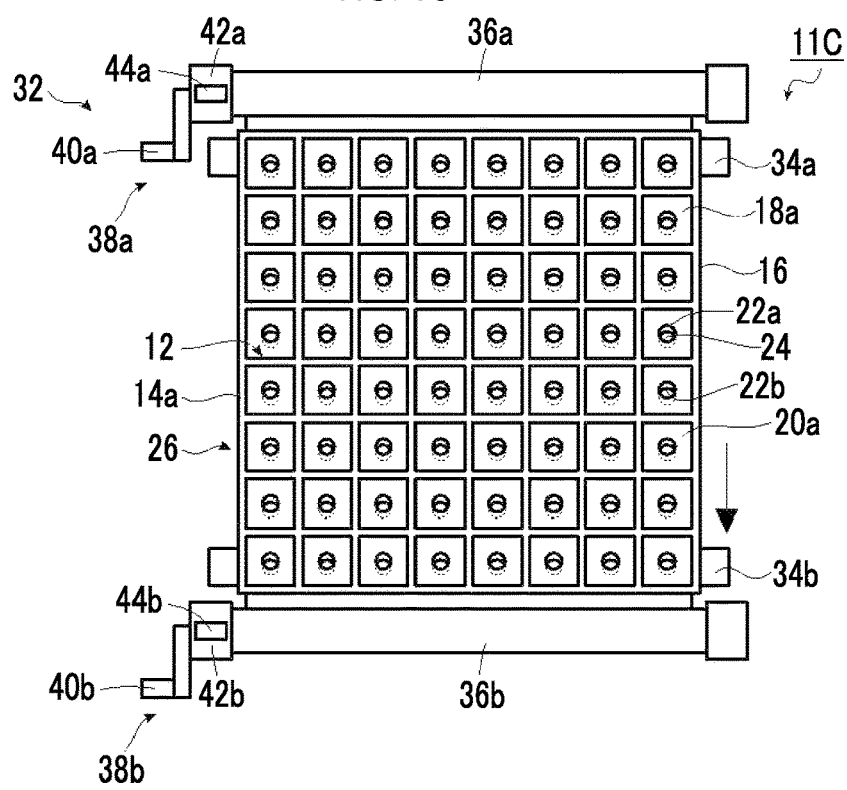

SOUNDPROOF STRUCTURE AND ADJUSTMENT METHOD OF SOUNDPROOF STRUCTURE

CROSS-REFERENCE TO RELATED APPLICATIONS

This application is a Continuation of PCT International Application No. PCT/JP2017/005034 filed on Feb. 13, 2017, which claims priority under 35 U.S.C § 119(a) to Japanese Patent Application No. 2016-060271 filed on Mar. 24, 2016. Each of the above application(s) is hereby expressly incorporated by reference, in its entirety, into the present application.

BACKGROUND OF THE INVENTION

1. Field of the Invention

The present invention relates to a soundproof structure for selectively blocking sound having a specific frequency and an adjustment method of a soundproof structure. Specifically, the present invention relates to a soundproof structure that, in the case of laminating a plurality of different films in which holes having a predetermined size are provided and fixing the films with a rigid frame having a predetermined size, can adjust the frequency of sound to be selectively strongly shielded by changing the relative position relationship between the holes of the different films by moving the plurality of different films laminated relative to each other and accordingly changing the size of a through-hole formed by holes overlapping each other and to an adjustment method of a soundproof structure for adjusting the frequency of sound to be selectively strongly shielded.

2. Description of the Related Art

In the case of a general sound insulation material, the heavier the mass, the better the sound is shielded. Accordingly, in order to obtain a good sound insulation effect, the sound insulation material itself becomes large and heavy. On the other hand, in particular, it is difficult to shield sounds having low frequency components. In general, this region is called a mass law, and it is known that the shielding increases by 6 dB in a case where the frequency doubles.

As described above, most of the conventional soundproof structures, such as sound blocking structures, are disadvantageous in that the soundproof structures are large and heavy due to sound insulation by the mass of the structures. In addition, the conventional soundproof structures are disadvantageous in that it is difficult to shield low frequencies.

For this reason, as a sound insulation material corresponding to various situations, such as equipment, automobiles, and general households, a light and thin sound insulation structure has been demanded. In recent years, therefore, a sound insulation structure for controlling the vibration of a film by attaching a frame to a thin and light film structure has been drawing attention (refer to JP4832245B and U.S. Pat. No. 7,395,898B (corresponding Japanese Patent Application Publication: JP2005-250474A)).

In the case of these structures, the principle of sound insulation is a stiffness law different from the mass law described above. Accordingly, low frequency components can be shielded even with a thin structure. This region is called a stiffness law, and the behavior is the same as in a case where a film has a finite size matching a frame opening portion since the film vibration is fixed at the frame portion.

JP4832245B discloses a sound absorber that has a frame body, which has a through-hole formed therein, and a sound absorbing material, which covers one opening of the through-hole and whose first storage modulus E1 is $9.7 \times 10^6$ or more and second storage modulus E2 is 346 or less (refer to abstract, claim 1, paragraphs [0005] to [0007] and [0034], and the like). The sound absorber is used with the opening on the back surface closed by the construction surface (refer to FIG. 1 and paragraph [0018]). The storage modulus of the sound absorbing material means a component, which is internally stored, of the energy generated in the sound absorbing material by sound absorption.

In JP4832245B, in the example, a sound absorbing material in which a blending material is a resin or a mixture of a resin and a filler is used. Therefore, in JP4832245B, since the peak value of the sound absorption rate is 0.5 to 1.0 and the peak frequency is 290 Hz to 500 Hz, it is possible to achieve a high sound absorption effect in a frequency region of 500 Hz or less without causing an increase in the size of the sound absorber.

In addition, U.S. Pat. No. 7,395,898B (corresponding Japanese Patent Application Publication: JP2005-250474A) discloses a sound attenuation panel including an acoustically transparent two-dimensional rigid frame divided into a plurality of individual cells, a sheet of flexible material fixed to the rigid frame, and a plurality of weights, and a sound attenuation structure (refer to claims 1, 12, and 15, FIG. 4, col. 4, and the like). In the sound attenuation panel, the plurality of individual cells are approximately two-dimensional cells, and each weight is fixed to the sheet of flexible material so that the weight is provided in each cell. The resonance frequency of the sound attenuation panel is defined by the two-dimensional shape of each cell, the flexibility of the flexible material, and each weight on the sound attenuation panel.

U.S. Pat. No. 7,395,898B (corresponding Japanese Patent Application Publication: JP2005-250474A) discloses that the sound attenuation panel has the following advantages compared with the related art. That is, (1) the acoustic panel can be made very thin. (2) The acoustic panel can be made very light (with a low density). (3) The acoustic panel can be laminated together to form wide-frequency locally resonant sonic materials (LRSM) since the panel does not follow the mass law over a wide frequency range. Accordingly, the acoustic panel can deviate from the mass law at frequencies lower than 500 Hz. (4) The acoustic panel can be easily and inexpensively manufactured (refer to col. 5, line 65 to col. 6, line 5).

SUMMARY OF THE INVENTION

Incidentally, since the sound absorber disclosed in JP4832245B is light and the peak value of the sound absorption rate is as high as 0.5 or more, it is possible to achieve a high sound absorption effect in a low frequency region where the peak frequency is 500 Hz or less. However, in the sound absorber, there is a problem that it is difficult to select a sound absorbing material since the range of selection of a sound absorbing material is narrow.

In addition, since the sound absorbing material of such a sound absorber completely blocks the through-hole of the frame body, the sound absorbing material does not allow wind and heat to pass therethrough and accordingly heat tends to accumulate on the inside. For this reason, there is a problem that such a sound absorber is not suitable for the sound insulation of equipment and automobiles, which is disclosed in JP4832245B.

In addition, the sound insulation performance of the sound absorber disclosed in JP4832245B changes smoothly according to the usual stiffness law or mass law. For this reason, it has been difficult to effectively use the sound absorber disclosed in JP4832245B in general equipment or automobiles in which specific frequency components, such as motor sounds, are often strongly generated in a pulsed manner.

Even in a case where the sound insulation performance of the sound absorber disclosed in JP4832245B can be designed in advance so as to insulate sound having a specific frequency emitted from general equipment or automobiles, in a case where the frequency of the sound to be insulated changes during the use of general equipment, automobiles, and the like, it is not possible to change the sound insulation frequency with the sound absorber disclosed in JP4832245B. For this reason, in the sound absorber disclosed in JP4832245B, there is a problem that it is necessary to redesign the sound absorber in accordance with the changed frequency and manufacture the sound absorber again.

In U.S. Pat. No. 7,395,898B (corresponding Japanese Patent Application Publication: JP2005-250474A), the sound attenuation panel can be made very thin and light at low density, can be used at frequencies lower than 500 Hz, can deviate from the law of mass density, and can be easily manufactured at low cost. However, as a lighter and thinner sound insulation structure required in equipment, automobiles, general households, and the like, the sound attenuation panel disclosed in U.S. Pat. No. 7,395,898B (corresponding Japanese Patent Application Publication: JP2005-250474A) has the following problems.

In the sound attenuation panel disclosed in U.S. Pat. No. 7,395,898B (corresponding Japanese Patent Application Publication: JP2005-250474A), a weight is essential for the film. Accordingly, since the structure becomes heavy, it is difficult to use the sound attenuation panel in equipment, automobiles, general households, and the like.

There is no easy means for placing the weight in each cell structure. Accordingly, there is no manufacturing suitability.

Since the frequency and size of shielding strongly depend on the weight of the weight and the position of the weight on the film, robustness as a sound insulation material is low. Accordingly, there is no stability.

Since the film is specified as an impermeable film, the film does not allow the wind and heat to pass therethrough and accordingly the heat tends to accumulate on the inside. For this reason, this is not suitable for the sound insulation of equipment and automobiles in particular.

In addition, in the sound attenuation panel disclosed in U.S. Pat. No. 7,395,898B (corresponding Japanese Patent Application Publication: JP2005-250474A), even in a case where the sound emitted from general equipment, automobiles, general households, and the like can be insulated, the frequency of sound to be insulated in general equipment, automobiles, general households, and the like may change. In this case, in the sound attenuation panel disclosed in U.S. Pat. No. 7,395,898B (corresponding Japanese Patent Application Publication: JP2005-250474A), since the sound insulation frequency cannot be changed, there is a problem that it is necessary to redesign the sound attenuation panel in accordance with the changed frequency and manufacture the sound attenuation panel again.

An object of the present invention is to solve the aforementioned problems of the conventional techniques and provide a soundproof structure, which can selectively block sound having a specific frequency emitted from equipment, automobiles, and general households and can change the cutoff frequency of the sound in accordance with a change in the frequency of sound to be blocked, and an adjustment method of a soundproof structure for adjusting the frequency of sound to be selectively strongly shielded in such a soundproof structure.

In addition to the above-described object, another object of the present invention is to solve the aforementioned problems of the conventional techniques and provide a soundproof structure which is light and thin, in which sound insulation characteristics such as a cutoff frequency and a cutoff size do not depend on the position and shape of the hole, which has high robustness as a sound insulation material and is stable, which has air permeability so that wind and heat can pass therethrough and accordingly has no heat accumulated on the inside, which is suitable for equipment, automobiles, and general households applications, and which is excellent in manufacturing suitability, and an adjustment method of a soundproof structure for adjusting the cutoff frequency of sound in such a soundproof structure.

In a soundproof structure having two or more films of the present invention, each film (single film) of the two or more films also forms a soundproof structure.

In the present invention, "soundproof" includes the meaning of both "sound insulation" and "sound absorption" as acoustic characteristics, but in particular, refers to "sound insulation". "Sound insulation" refers to "shielding sound". That is, "sound insulation" refers to "not transmitting sound". Therefore, "sound insulation" includes "reflecting" sound (reflection of sound) and "absorbing" sound (absorption of sound) (refer to Sanseido Daijirin (Third Edition) and http://www.onzai.or.jp/question/soundproof.html and http://www.onzai.or.jp/pdf/new/gijutsu201312_3.pdf on the web page of the Japan Acoustological Materials Society).

Hereinafter, basically, "sound insulation" and "shielding" are referred to in a case where "reflection" and "absorption" are not distinguished from each other, and "reflection" and "absorption" are referred to in a case where "reflection" and "absorption" are distinguished from each other.

Therefore, in order to achieve the aforementioned object, the present inventors have made intensive studies and, as a result, have found that, by forming a plurality of thin films (single films) of the above soundproof structure and controlling the size of a hole to be a desired area by changing the positional relationship, the cutoff frequency of sound can be changed according to a change even in a case where the frequency of the sound to be blocked is changed, leading to the present invention.

That is, the present invention provides a soundproof structure comprising: a laminated film in which two or more films each comprising one or more holes drilled therein are laminated; and two rigid frames that fix the laminated film so as to be interposed from both sides of the laminated film. At least parts of the one or more holes in the respective films of the laminated film overlap each other.

It is preferable that two adjacent films of the two or more films are spaced apart from each other by a spacer.

It is preferable that the two or more films are spaced apart from each other at distances of 100 μm or less.

It is preferable that at least one film of the two or more films is movable and at least one rigid frame of the two rigid frames is attachable and detachable at the time of movement of the at least one film.

It is preferable that a size of a cell surrounded by each rigid frame of the two rigid frames is smaller than a wavelength of sound.

It is preferable that sizes of the one or more holes are 0.1 mm or more and 10 mm or less.

It is preferable that one film of the two or more films is movable relative to remaining films other than the one film and that a through-hole formed by overlapping of the one or more holes of the two or more films of the laminated film has a hole size adjusted according to a relative movement amount of the one film with respect to the remaining films.

It is preferable to further comprise a moving device that moves the one film relative to the remaining films.

It is preferable that the two or more films of the laminated film have one first film, which is the one film, and at least one second film of the remaining films, and the first film moves relative to the second film and that the moving device has a roll that winds the first film, one film of the at least one second film, or at least two films including the first film and one film of the at least one second film and a winding device that winds the first film, the one film of the at least one second film, or the at least two films including the first film and one film of the at least one second film on the roll by rotating the roll.

It is preferable that the moving device further includes a gauge provided on the roll and a movement amount of the first film, the one film of the at least one second film, or the at least two films including the first film and one film of the at least one second film and a hole size of the through-hole are measured by the gauge.

In order to achieve the aforementioned object, the present invention provides an adjustment method of a soundproof structure comprising adjusting a hole size of a through-hole, which is formed by overlapping of the one or more holes of the two or more films of the laminated film of the soundproof structure described above, by changing relative positions of the two or more films of the laminated film.

It is preferable that the relative positions of the two or more films are changed by moving at least one film of the two or more films.

It is preferable that the two or more films of the laminated film have one first film, which is the one film, and at least one second film of the remaining films, and the first film moves relative to the second film and that the relative positions of the two or more films are changed by rotating a roll that winds the first film, one film of the at least one second film, or at least two films including the first film and one film of the at least one second film so that the first film, the one film of the at least one second film, or the at least two films including the first film and one film of the at least one second film are wound on the roll.

It is preferable that a movement amount of the first film, the one film of the at least one second film, or the at least two films including the first film and one film of the at least one second film and a size of the through-hole are measured by a gauge provided on the roll.

According to the present invention, it is possible to selectively block sound having a specific frequency emitted from equipment, automobiles, and general households and change the cutoff frequency of the sound in accordance with a change in the frequency of sound to be blocked.

According to the present invention, it is possible to provide a soundproof structure which is light and thin, in which sound insulation characteristics such as a cutoff frequency and a cutoff size do not depend on the position and shape of the hole, which has high robustness as a sound insulation material and is stable, which has air permeability so that wind and heat can pass therethrough and accordingly has no heat accumulated on the inside. As a result, it is possible to provide a soundproof structure that is suitable for equipment, automobiles, and general households applications and that is excellent in manufacturing suitability.

In addition, according to the present invention, it is possible to provide an adjustment method of a soundproof structure for adjusting the cutoff frequency of the sound to be insulated. According to the present invention, it is possible to adjust the cutoff frequency of the sound without performing reconfiguration of constituent films and the like in one soundproof structure set.

BRIEF DESCRIPTION OF THE DRAWINGS

FIGS. 9A, 9B, 9C and 9D are schematic cross-sectional views showing the progress from the form before adjustment of the cutoff frequency to the form after adjustment of the soundproof structure shown in FIG. 8.

FIG. 10 is a plan view schematically showing an example of a soundproof structure according to another embodiment of the present invention.

DESCRIPTION OF THE PREFERRED EMBODIMENTS

Hereinafter, a soundproof structure and an adjustment method of a soundproof structure according to the present invention will be described in detail with reference to preferred embodiments shown in the accompanying diagrams.

Hereinafter, a case where the number of films, such as thin films forming a soundproof structure, is two and the number of holes drilled in one film is one will be described as a representative example. However, the present invention is not limited thereto, and it is needless to say that the number of films may be three or more or the number of holes may be two or more.

Figure 1:
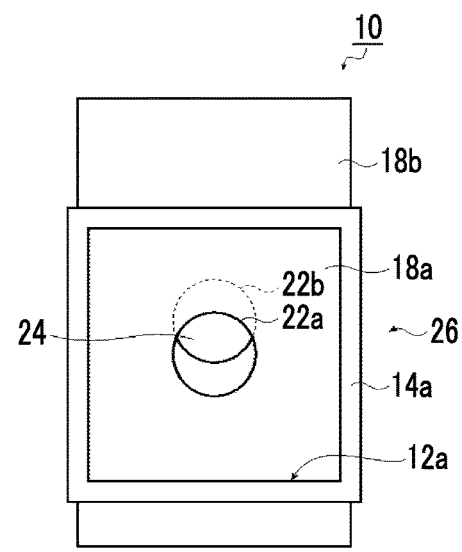
FIG. 1 is a plan view schematically showing an example of a single soundproof cell of a soundproof structure according to an embodiment of the present invention.
Figure 2:
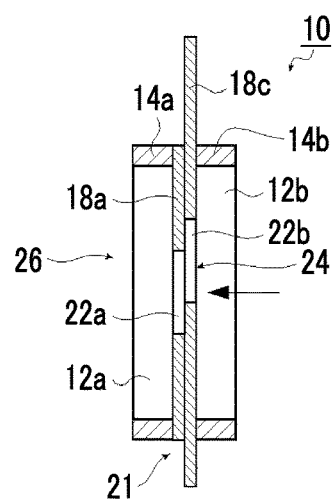
FIG. 2 is a schematic cross-sectional view of the soundproof structure shown in FIG. 1.

FIG. 1 is a plan view schematically showing an example of a single soundproof cell of a soundproof structure according to an embodiment of the present invention, and FIG. 2 is a schematic cross-sectional view of the soundproof structure shown in FIG. 1.

A soundproof structure 10 of a first embodiment of the present invention shown in FIGS. 1 and 2 is configured to include only one soundproof cell 26, that is, a single soundproof cell 26. The soundproof structure 10 includes two films 18a and 18b including one hole 22a and one hole 22b, respectively, and two rigid frames 14a and 14b that include opening portions 12a and 12b having the same size and that fix the two films 18a and 18b so as to be interposed from both sides. That is, in FIGS. 1 and 2, only the single soundproof cell 26 is shown as the soundproof structure 10 of the present embodiment. However, the present invention is not limited thereto, and it is needless to say that the soundproof structure may be configured to include a plurality of soundproof cells (refer to FIGS. 5 and 6) as will be described later.

In the example shown in FIGS. 1 and 2, the two films 18a and 18b are laminated in a relative position relationship in which the holes 22a and 22b overlap each other. Since the films 18a and 18b are fixed by being interposed between the two rigid frames 14a and 14b from both sides, the films 18a and 18b can physically be regarded as one film. In this case, the two rigid frames 14a and 14b fix the two films 18a and 18b so as to be interposed from both sides such that the opening portions 12a and 12b having the same size match each other and the holes 22a and 22b are located within the matched opening portions 12a and 12b.

In the example shown in FIGS. 1 and 2, the film 18a is fixed to the rigid frame 14a in advance by an adhesive or a physical fixture.

Therefore, in the present embodiment, the film 18a and the film 18b are fixed to the rigid frames 14a and 14b by interposing the film 18a and the film 18b fixed to the rigid frame 14a between the rigid frame 14a and the rigid frame 14b from the outer side of the film 18b and pressing the film 18a and the film 18b from one side or both sides.

In the example shown in FIGS. 1 and 2, it is preferable that the two films 18a and 18b are brought into close contact with each other to form one close contact laminated film 21 in the relative position relationship. The two films 18a and 18b may be in contact with each other.

Here, the hole 22a of the film 18a and the hole 22b of the film 18b are shifted from each other but have portions overlapping each other, and accordingly, form a through-hole 24 configured to include a portion passing through the close contact laminated film 21 that is one film. Here, "holes 22a and 22b are shifted from each other" means that the centers of the holes 22a and 22b do not match each other and are separated from each other.

In the present invention, the two films 18a and 18b are not limited to those forming one close contact laminated film 21. As long as the two films 18a and 18b can be regarded as one film as a soundproof structure, as will be described later, the films 18a and 18b may be disposed so as to be spaced apart from each other by a distance within a range where the near field of sound can reach. That is, it is sufficient that the two films 18a and 18b are brought close to each other by a distance that can be regarded as one film or less.

Although the number of holes 22a and 22b drilled in the films 18a and 18b is one in the example shown in FIGS. 1 and 2, the present invention is not limited thereto. As will be described later, a plurality of holes may be provided.

One film 18a of the two films 18a and 18b forms, for example, one first film of the present invention. On the other hand, the other film 18b forms, for example, at least one second film among the remaining films of the present invention, and can move relative to the film 18a that is the first film to change the relationship of the relative position with respect to the film 18a.

The soundproof structure 10 of the present embodiment changes the relative position relationship in which the holes 22a and 22b of the two films 18a and 18b overlap each other by moving the film 18b, which is one second film, relative to the film 18a that is the first film.

As described above, in the soundproof structure 10 of the present embodiment, the size of the through-hole 24 of the close contact laminated film 21 is changed by changing the relative position relationship between the hole 22a of the film 18a and the hole 22b of the film 18b by moving the film 18a and the film 18b relative to each other. As a result, it is possible to adjust the cutoff frequency of the sound depending on the changed size of the through-hole 24, the mechanical properties of the film 18a and the film 18b in a case where the film 18a and the film 18b can be regarded as one film (in the example shown in FIGS. 1 and 2, mechanical properties of the close contact laminated film 21: for example, mechanical constant properties such as a Young's modulus), and the structures of the two rigid frames 14a and 14b.

In the present invention, the relative movement means that the other one moves in a case where one is stopped or in a case where it is regarded that one is stopped. For example, the relative movement between the film 18a and the film 18b means any of that the film 18b moves in a case where the film 18a is stopped, and conversely, that the film 18a moves in a case where the film 18b is stopped, that the film 18b moves independently in a case where the film 18a can be regarded as being stopped in a case where both the film 18a and the film 18b move, and conversely, that the film 18a moves independently in a case where the film 18b can be regarded as being stopped in a case where both the film 18a and the film 18b move.

In the present invention, the relative position refers to a fixed reference point or a point whose position is determined with respect to a moving reference point, and is expressed by azimuth and distance from the reference point. For example, the relative position between the film 18a and the film 18b refers to a specific point in the film 18b, which is positioned with respect to a reference point that is a specific point in the film 18a, regardless of whether the film 18a and the film 18b are fixed or moving, and can be expressed by the direction and the distance of both the points. Here, it is preferable that each of specific points in the film 18a and the film 18b is set as a corresponding point in advance. For example, it is preferable that the specific points in the film 18a and the film 18b are the center of the hole 22a of the film 18a and the center of the hole 22b of the film 18b. In this case, the relative position between the film 18a and the film 18b in a case where the film 18a and the film 18b move relative to each other refers to the position of the center of the hole 22b of the film 18b with respect to the center of the hole 22a of the film 18a or conversely the position of the center of the hole 22a of the film 18a with respect to the center of the hole 22b of the film 18b, and can be expressed by the distance between the centers in the relative movement direction.

In the present invention, in a case where the film 18a and the film 18b move relative to each other, the film 18a and the film 18b may be slidable. In this case, the sliding direction (that is, the relative movement direction) between the film 18a and the film 18b is a direction along the same plane as the surfaces of the film 18a and the film 18b or a parallel direction. That is, the film 18a and the film 18b may slide in the same plane as the surfaces of the film 18a and the film 18b to move relative to each other.

As will be described later, the principle of blocking the sound having a specific cutoff frequency by the soundproof structure 10 of the present embodiment is a sound insulation principle in which transmitted sound is insulated by causing interference to cancel out the air propagating sound passing through the through-hole 24 and the vibration radiated sound passing through the films 18a and 18b by vibrating the films 18a and 18b as one film in a case where the films 18a and 18b can be regarded as one film. The sound insulation principle is called a stiffness law that does not depend on the mass (mass law) of the soundproof structure.

Figure 3A:
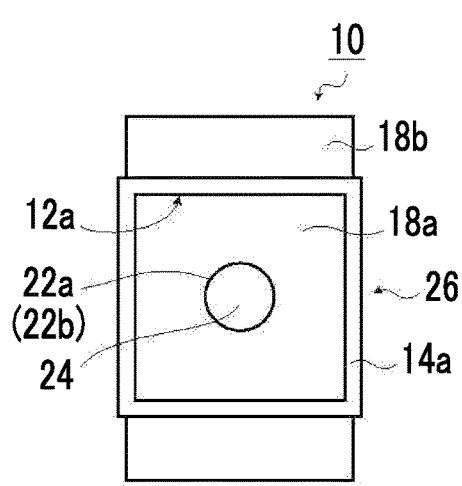
FIGS. 3A and 3B are plan views showing forms before and after cutoff frequency adjustment of the soundproof structure shown in FIG. 1.
Figure 3B:
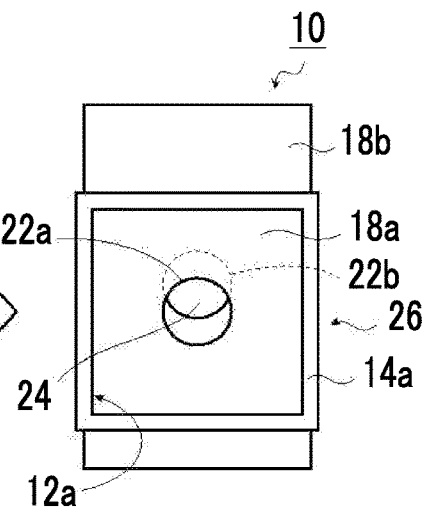

FIGS. 3A and 3B are plan views showing forms before and after cutoff frequency adjustment of the soundproof structure shown in FIG. 1. The forms of the soundproof structure 10 shown in FIGS. 3A and 3B are forms in which the size of the through-hole 24 of the close contact laminated film 21 is different.

Assuming that the form of the soundproof structure 10 shown in FIG. 3A is, for example, a form before adjustment, in the form before the adjustment, the hole 22a of the film 18a and the hole 22b of the film 18b are laminated so as to match each other, the films 18a and 18b of the close contact laminated film 21 are fixed by being interposed between the rigid frames 14a and 14b from both the outer sides, and the through-hole 24 matches the hole 22a and the hole 22b. Also in this form, it is possible to block the sound having a specific frequency (for example, a cutoff frequency before adjustment) depending on the size of the through-hole 24, the mechanical properties of the close contact laminated film 21 that can physically be regarded as one film, and the structures of the two rigid frames 14a and 14b.

On the other hand, the form of the soundproof structure 10 shown in FIG. 3B can be said to be a form after adjustment relative to the form shown in FIG. 3A. However, the form after adjustment is the same as the form of the soundproof structure 10 shown in FIGS. 1 and 2.

As described above, in the present invention, the relative position relationship between the films 18a and 18b is changed by moving one film 18b relative to the other film 18a while maintaining the distance between the films 18a and 18b, in which the hole 22a and the hole 22b are drilled, at a distance that can physically be regarded as one film. That is, the relative positions of the centers of the hole 22a and the hole 22b are changed. In this manner, in the present invention, it is possible to adjust the cutoff frequency by changing the equivalent hole size and changing the cutoff frequency before adjustment to the cutoff frequency after adjustment with the size of the through-hole 24. In the present invention, for example, moving the film 18b with respect to the film 18a to change the relative position relationship between the films 18a and 18b may be referred to as shifting the film 18b with respect to the film 18a.

The change from the form of the soundproof structure 10 shown in FIG. 3A to the form of the soundproof structure 10 shown in FIG. 3B, that is, the change of the size of the through-hole 24 of the close contact laminated film 21 can be performed as shown in FIGS. 4A, 4B, 4C and 4D.

FIGS. 4A, 4B, 4C and 4D are schematic cross-sectional views showing the progress from the form before adjustment of the cutoff frequency to the form after adjustment of the soundproof structure shown in FIG. 1.

Figures 4A, 4B, 4C, 4D:
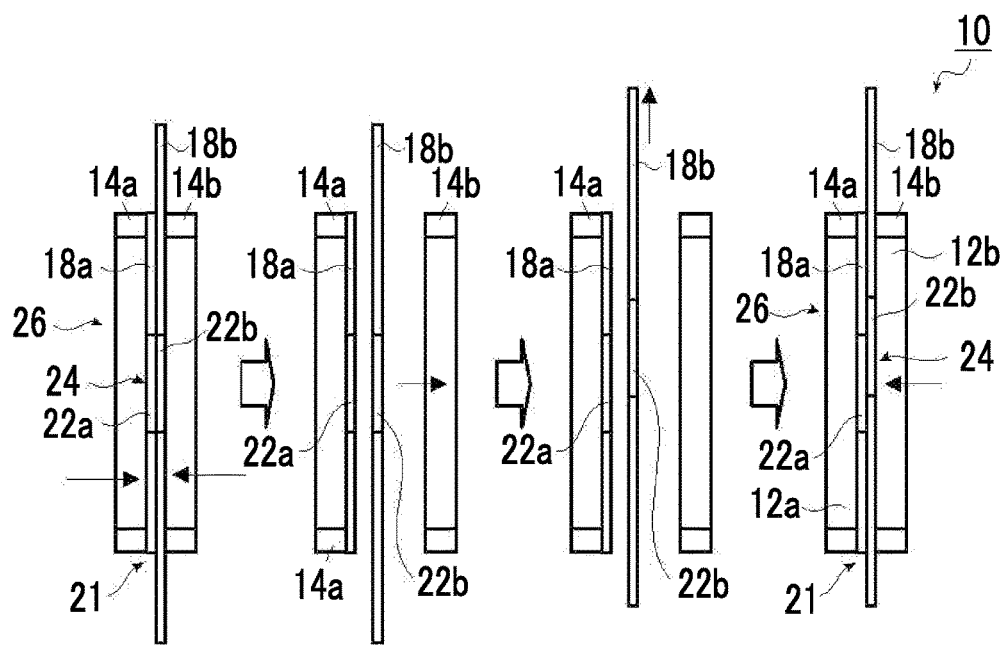
FIGS. 4A, 4B, 4C and 4D are schematic cross-sectional views showing the progress from the form before adjustment of the cutoff frequency to the form after adjustment of the soundproof structure shown in FIG. 1.

FIG. 4A shows the form of the soundproof structure 10 shown in FIG. 3A.

In the form of the soundproof structure 10 shown in FIG. 4A, the rigid frames 14a and 14b fix the film 18a and the film 18b so as to be interposed therebetween so that the hole 22a and the hole 22b match each other to become the through-hole 24 of the close contact laminated film 21.

In this case, in order to prevent the two films 18a and 18b from sticking together, it is preferable to use a matte material or to remove static electricity in advance by making the films 18a and 18b conductive.

As shown in FIG. 4B, one rigid frame 14b of the rigid frames 14a and 14b in this form is removed from the fixed state, and moves to the outer side (right side in the diagram) with respect to the films 18a and 18b so as to be spaced apart from the films 18a and 18b. Then, the film 18b is similarly moved to the outer side (right side in the diagram) with respect to the film 18a so as to be spaced apart from the film 18a. In this case, the rigid frame 14b functions as a presser against the film 18b.

First, after the film 18b and the rigid frame 14b are integrally moved to the outer side with respect to the film 18a so as to be spaced apart from the film 18a, the rigid frame 14b may be moved to the outer side with respect to the film 18b as to be spaced apart from the film 18b.

In this manner, the film 18b becomes in a free state in which the film 18b is in contact with neither the film 18a nor the rigid frame 14b.

Thereafter, as shown in FIG. 4C, the film 18b in the free state is moved in a direction (upper side in the diagram) parallel to the surface of the film 18a, thereby changing the relative position relationship between the films 18a and 18b. That is, the film 18b is shifted with respect to the film 18a. In this case, it is necessary to move (shift) the film 18b to a position where the holes 22a and 22b necessarily overlap each other so that the through-hole 24 can be formed.

As described above, it is preferable that the rigid frames 14a and 14b that fix the two films 18a and 18b so as to be interposed from both sides are attachable and detachable at the time of movement or sliding of each of the two films 18a and 18b.

Finally, as shown in FIG. 4D, the film 18b is moved to the inner side (left side in the diagram) with respect to the film 18a so as to be brought into contact with the film 18a. Here, the rigid frame 14b is moved to the inner side with respect to the film 18b so as to be brought into contact with the film 18b and used as a presser, and the films 18a and 18b are pressed and fixed from one side or both sides of the rigid frames 14a and 14b in a state in which the films 18a and 18b are interposed between the rigid frames 14a and 14b.

Thus, the form shown in FIG. 4D becomes the same as the form of the soundproof structure 10 shown in FIG. 3B (that is, FIGS. 1 and 2).

That is, in the example described above, the two films 18a and 18b as thin films, in which the hole 22a and the hole 22b serving as openings having the same shape and positional relationship are provided, are made to overlap each other, and the relative position relationship between the films 18a and 18b is changed by moving one film 18b in a predetermined direction, thereby changing the diameter of the through-hole 24 that is the effective opening diameter.

In the example described above, the film 18a is fixed to the rigid frame 14a in advance, the film 18b is made to be movable, and the films 18a and 18b are fixed so as to be interposed between the rigid frames 14a and 14b from the outer side after movement. However, the present invention is not limited thereto. Even in a case where the film 18b is movable, the film 18a does not need to be fixed to the rigid frame 14a in advance, or the relative position relationship may be changed by moving both the films 18a and 18b simultaneously in opposite directions without fixing the film 18a to the rigid frame 14a in advance.

As described above, the soundproof structure 10 of the present embodiment shown in FIGS. 1 and 2, FIGS. 3A and 3B, and FIGS. 4A, 4B, 4C and 4D is configured to include only the single soundproof cell 26, or shows only the single soundproof cell 26. However, the present invention is not limited thereto, and the soundproof structure may be configured to include a plurality of soundproof cells 26 as shown in FIGS. 5 and 6.

Figure 5:
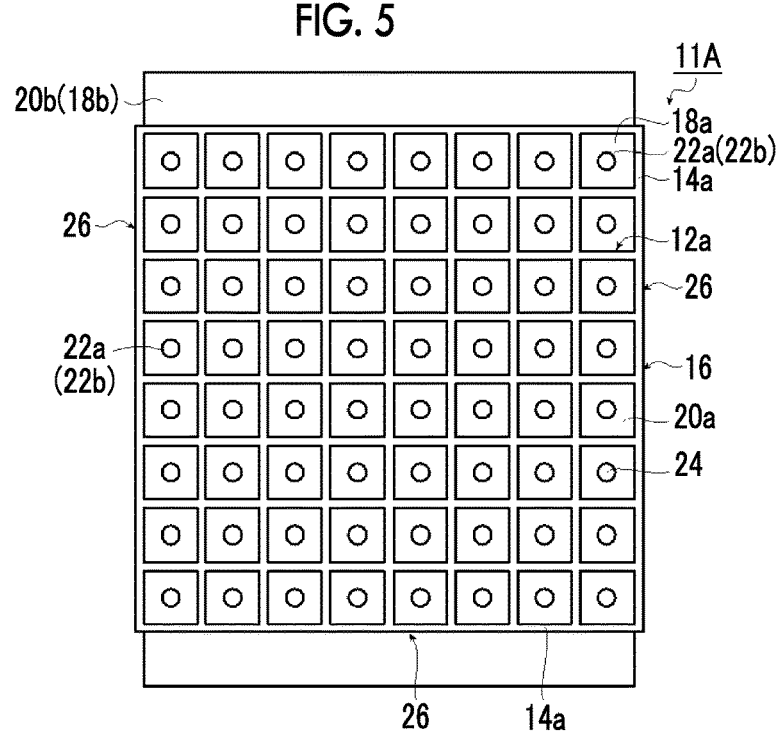
FIG. 5 is a plan view schematically showing an example of the form before adjustment of a soundproof structure according to another embodiment of the present invention.
Figure 6:
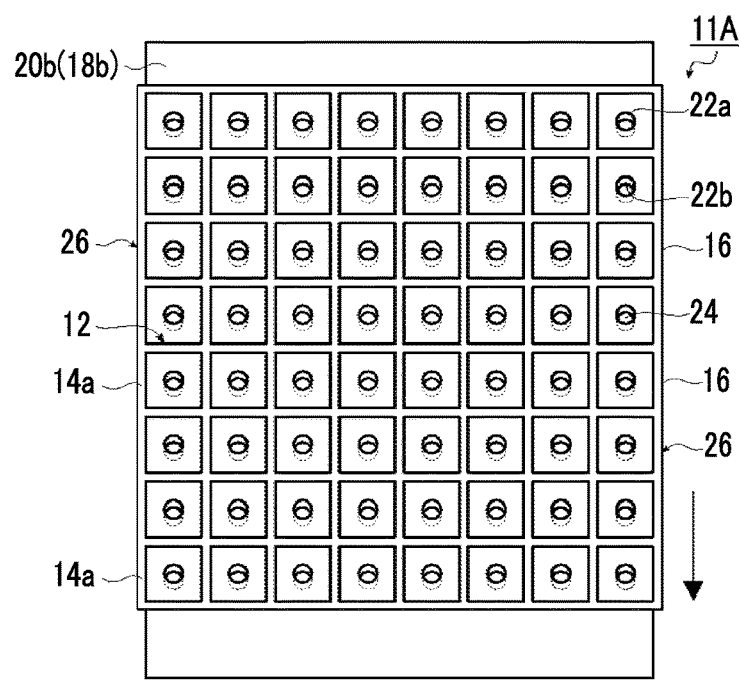
FIG. 6 is a plan view schematically showing an example of the form after adjustment of the soundproof structure shown in FIG. 5.

FIGS. 5 and 6 are plan views schematically showing examples of forms before and after adjustment of a soundproof structure according to another embodiment of the present invention.

A soundproof structure 11A shown in FIGS. 5 and 6 has a frame body 16, a frame body on the back surface side (not shown) that is located on the back surface side in the diagrams and has the same configuration as the frame body 16, a sheet-shaped film body 20a, and a sheet-shaped film body 20b (not shown in detail) that is located on the back surface side in the diagrams and has the same configuration as the sheet-shaped film body 20a. Here, the frame body 16 forms a plurality of rigid frames 14a each of which includes the opening portion 12a and which are arranged in a two-dimensional manner. The sheet-shaped film body 20a forms a plurality of films 18a fixed to the respective rigid frames 14a so as to cover the opening portion 12a of each rigid frame 14a. In the examples shown in FIGS. 5 and 6, the number of rigid frames 14a is, for example, 64, and the number of films 18a is, for example, 64.

In the present invention, the sheet-shaped film body (20a, 20b) is one sheet having a plurality (for example, 64) of films 18.

The film 18a in each rigid frame 14a of the frame body 16 has the hole 22a drilled so as to penetrate therethrough. Although not shown, it is needless to say that the film 18b in each rigid frame (14b) of the back surface side frame body also has the hole 22b drilled so as to penetrate therethrough.

In the soundproof structure 11A, one rigid frame 14a of the frame body 16 on the front surface side, the film 18a fixed to the rigid frame 14a, the hole 22a provided in the film 18a, one rigid frame (14b) of the frame body on the back surface side (not shown), the film 18b fixed to the rigid frame (14b), and the hole 22b provided in the film 18b form one single soundproof cell 26 shown in FIGS. 1 and 2. Therefore, the soundproof structure 11A of the present embodiment is formed by a plurality (for example, 64) of soundproof cells 26.

Here, since the form before adjustment of one single soundproof cell 26 of the soundproof structure 11A shown in FIG. 5 is the same as the form before adjustment of the single soundproof cell 26 of the soundproof structure 10 shown in FIG. 3A and FIG. 4A, the description of the form before adjustment of the soundproof structure 11A shown in FIG. 5 will be omitted.

In addition, since the form before adjustment of one single soundproof cell 26 of the soundproof structure 11A shown in FIG. 6 is the same as the form before adjustment of the single soundproof cell 26 of the soundproof structure 10 shown in FIG. 1, FIG. 2, FIG. 3B, and FIG. 4D, the description of the form before adjustment of the soundproof structure 11A shown in FIG. 6 will be omitted.

Hereinafter, individual components will be described. In a case where it is not necessary to separately describe components on the front surface side and the back surface side, the description will be given using reference numerals common to both components.

The rigid frame 14 (14a and 14b) is formed so as to be annularly surrounded by a thick plate-shaped member, and has the opening portion 12 (12a and 12b) thereinside. The rigid frame 14 (14a and 14b) is for fixing the film 18 (18a and 18b) so as to cover the opening portion 12 on at least one side, and serves as a node of film vibration of the film 18 fixed to the rigid frame 14. Accordingly, the rigid frame 14 has higher stiffness than the film 18. Specifically, both the mass and the stiffness of the rigid frame 14 per unit area need to be higher than the mass and the stiffness of the film 18 per unit area.

It is preferable that the shape of the rigid frame 14 has a closed continuous shape capable of fixing the film 18 so as to restrain the entire outer periphery of the film 18. However, the present invention is not limited thereto, and the rigid frame 14 may be made to have a discontinuous shape by cutting a part thereof as long as the rigid frame 14 serves as a node of film vibration of the film 18 fixed to the rigid frame 14. That is, since the role of the rigid frame 14 is to fix the film 18 to control the film vibration, the effect is achieved even in a case where there is a small cut in the rigid frame 14 or even in a case where there is a very small part that does not fix the film 18.

In the present invention, it is preferable that both end portions of the opening portion 12 (12a and 12b) of the rigid frame 14 (14a and 14b) are not closed. That is, it is preferable that both the end portions of the opening portion 12 (12a and 12b) of the rigid frame 14 (14a and 14b) are released together. In the present invention, therefore, it is preferable that a back air layer is not formed behind the film 18 (18a and 18b) unlike in the sound absorber disclosed in JP4832245B. Specifically, the film 18a is fixed to one end portion of the opening portion 12a of the rigid frame 14a. However, since the film 18a has the hole 22a, it can be said that the one end portion is open to the outside by the hole 22a. In addition, since nothing is attached or provided at the other end portion of the opening portion 12a of the rigid frame 14a, it can be said that the other end portion is open to the outside as it is. The rigid frame 14b is also the same. That is, since the film 18b is fixed to one end portion of the opening portion 12b but the film 18b has the hole 22b, it can be said that the one end portion is open to the outside by the hole 22b that overlaps the hole 22a to form the through-hole 24. In addition, since nothing is attached or provided at the other end portion of the opening portion 12b, it can be said that the other end portion is open to the outside as it is.

On the other hand, in the sound absorber disclosed in JP4832245B, a film-shaped sound absorbing material is laminated and fixed on the front surface of the frame body having a through-hole. In the sound absorber, the back surface of the frame body is bonded and fixed to the construction surface. The sound absorber is used in a state in which a back air layer is formed between the sound absorbing material and the construction surface. That is, among the openings of through-holes in the front and back surfaces of the frame body, the opening in the front surface is covered with the sound absorbing material, and the opening in the back surface is closed by the construction surface.

As described above, the soundproofing principle of the sound absorber disclosed in JP4832245B is to use so-called Helmholtz resonance. On the other hand, the soundproofing principle of the soundproof structure of the present invention is to insulate transmitted sound by causing interference to cancel out the air propagating sound passing through the through-hole 24 and the vibration radiated sound passing through the film 18 (18*a*, 18*b*) by vibrating the film 18 (18*a*, 18*b*). Therefore, both are completely different.

Figure 14:
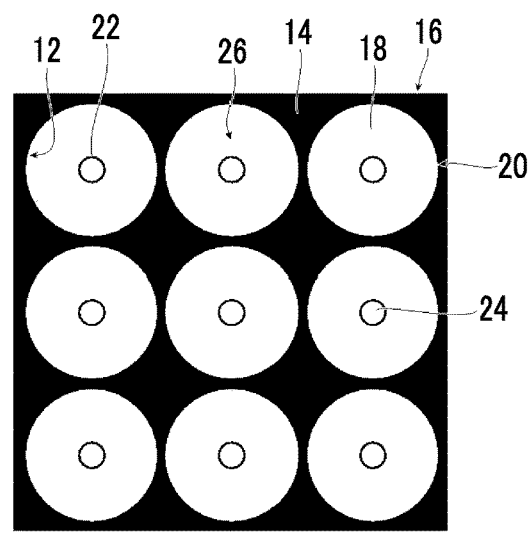
FIG. 14 is a plan view schematically showing an example of a soundproof structure according to another embodiment of the present invention.
Figure 15:
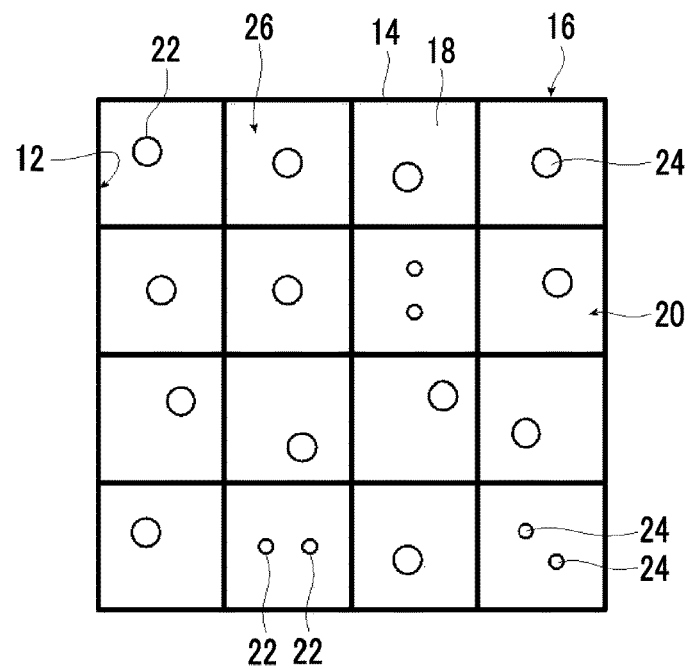
FIG. 15 is a plan view schematically showing an example of a soundproof structure according to another embodiment of the present invention.
Figure 16:
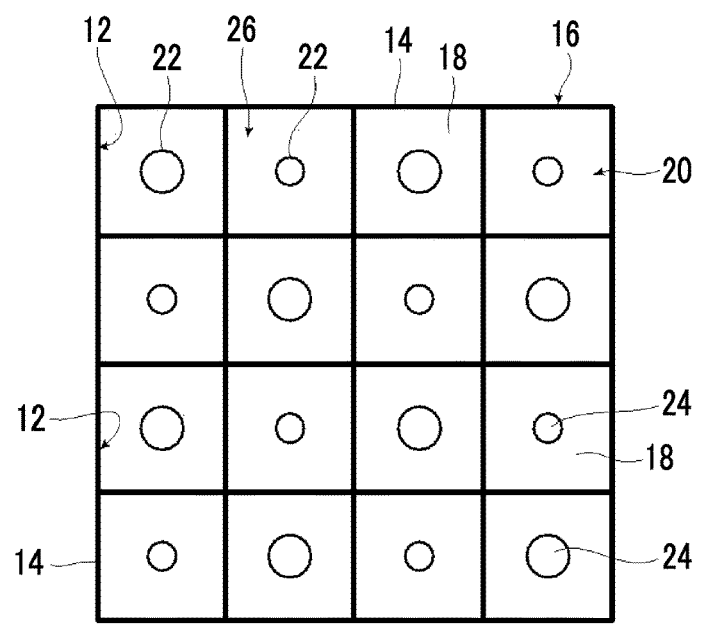
FIG. 16 is a plan view schematically showing an example of a soundproof structure according to another embodiment of the present invention.

The geometric form of the opening portion 12 formed by the rigid frame 14 is a planar shape (in the example shown in FIG. 1, a square). In the examples shown in FIG. 1, FIGS. 3A and 3B, and FIGS. 5, 10, 12, 15, and 16, the geometric form of the opening portion 12 is a square. In the present invention, however, the geometric form of the opening portion 12 is not particularly limited. For example, the geometric form of the opening portion 12 may be a quadrangle such as a rectangle, a diamond, or a parallelogram, a triangle such as an equilateral triangle, an isosceles triangle, or a right triangle, a polygon including a regular polygon such as a regular pentagon or a regular hexagon, a circular shape shown in FIG. 14, an elliptical shape, and the like, or may be an irregular shape. In FIGS. 14 to 16, for the sake of simplicity, components on the front and back surface sides are not distinguished, and reference numerals common to both are described.

The size of the rigid frame 14 is a size in plan view, and can be defined as the size of the opening portion 12. Here, in the case of a regular polygon such as a square shown in FIG. 1 and the like, the size of the rigid frame 14 can be defined as a distance between opposite sides passing through the center. In the case of a circle, the size of the rigid frame 14 can be defined as a circle equivalent diameter. In the case of a polygon, an ellipse, or an irregular shape, the size of the rigid frame 14 can be defined as a circle equivalent diameter. In the present invention, the circle equivalent diameter and the radius are a diameter and a radius at the time of conversion into circles having the same area.

In the soundproof structures 10 and 11A of the present invention, the size of the rigid frame 14 may be fixed in all rigid frames 14. However, rigid frames having different sizes (including a case where shapes are different) may be included. In this case, the average size of the rigid frames 14 may be used as the size of the rigid frame 14.

The size of the rigid frame 14 is not particularly limited, and may be set according to a soundproofing target to which the soundproof structures 10 and 11A of the present invention is applied, for example, industrial equipment, transportation equipment, and general household equipment. As the industrial equipment, for example, a copying machine, a blower, air conditioning equipment, a ventilator, pumps, a power generator, a duct, and other various kinds of manufacturing equipment capable of emitting sound such as a coating machine, a rotary machine, and a conveyor machine can be mentioned. As the transportation equipment, for example, an automobile, a train, and aircraft can be mentioned. As the general household equipment, for example, a refrigerator, a washing machine, a dryer, a television, a copying machine, a microwave oven, a game machine, an air conditioner, a fan, a PC, a vacuum cleaner, and an air purifier can be mentioned.

The soundproof structures 10 and 11A themselves can be used like a partition in order to shield sound from a plurality of noise sources. Also in this case, the size of the rigid frame 14 can be selected from the frequency of the target noise.

Although the details will be described later, it is preferable to reduce the size of the rigid frame 14 in order to obtain the natural vibration mode of the structure configured to include the rigid frame 14 and the film 18 on the high frequency side.

In addition, although the details will be described later, in order to prevent sound leakage due to diffraction at the shielding peak of the single soundproof cell 26 due to the hole 22 (22*a* and 22*b*) provided in the film 18, it is preferable that the average size of the rigid frame 14 is equal to or less than the wavelength size corresponding to a shielding peak frequency to be described later. That is, it is preferable that the size of the cell surrounded by the rigid frame 14 is smaller than the wavelength of the sound. Therefore, it is preferable that the size of the opening portion 12 (in other words, also referred to as the size of the soundproof cell 26) is smaller than the wavelength of the sound.

For example, the size of the rigid frame 14 is preferably 0.5 mm to 200 mm, more preferably 1 mm to 100 mm, and most preferably 2 mm to 30 mm.

The size of the rigid frame 14 is preferably expressed by an average size, for example, in a case where the respective rigid frames 14 have different sizes.

In addition, the width and the thickness of the rigid frame 14 are not particularly limited as long as the film 18 can be fixed so as to be reliably restrained and accordingly the film 18 can be reliably supported. For example, the width and the thickness of the rigid frame 14 can be set according to the size of the rigid frame 14.

For example, in a case where the size of the rigid frame 14 is 0.5 mm to 50 mm, the width of the rigid frame 14 is preferably 0.5 mm to 20 mm, more preferably 0.7 mm to 10 mm, and most preferably 1 mm to 5 mm.

In a case where the ratio of the width of the rigid frame 14 to the size of the rigid frame 14 is too large, the area ratio of the rigid frame 14 with respect to the entire structure increases. Accordingly, there is a concern that the device will become heavy. On the other hand, in a case where the ratio is too small, it is difficult to strongly fix the film 18*a* with an adhesive or the like in the rigid frame 14 portion or to strongly fix the films 18*a* and 18*b* by strongly pressing the films 18*a* and 18*b* from both sides.

In a case where the size of the rigid frame 14 exceeds 50 mm and is equal to or less than 200 mm, the width of the rigid frame 14 is preferably 1 mm to 100 mm, more preferably 3 mm to 50 mm, and most preferably 5 mm to 20 mm.

In addition, the thickness of the rigid frame 14 is preferably 0.5 mm to 200 mm, more preferably 0.7 mm to 100 mm, and most preferably 1 mm to 50 mm.

It is preferable that the width and the thickness of the rigid frame 14 are expressed by an average width and an average thickness, for example, in a case where the respective rigid frames 14 have different widths and thicknesses.

In the present invention, it is preferable that a plurality of (that is, two or more) rigid frames 14 are formed as the frame body 16 (frame body on the back surface side is also represented by the frame body 16 on the front surface side) arranged so as to be connected in a two-dimensional manner.

Here, the number of rigid frames 14 of the soundproof structure 10 of the present invention is not particularly limited, and may be set according to the above-described soundproofing target of the soundproof structure 11A of the present invention. That is, in the examples shown in FIGS. 5, 6, 10, 11, 15, and 16, the number of rigid frames 14 forming the frame body 16 may be set according to the above-described soundproofing target of the soundproof structure 11A of the present invention. Alternatively, since the size of the rigid frame 14 described above is set according to the above-described soundproofing target, the number of rigid frames 14 may be set according to the size of the rigid frame 14.

For example, in the case of in-device noise shielding (reflection and/or absorption), the number of rigid frames 14 is preferably 1 to 10000, more preferably 2 to 5000, and most preferably 4 to 1000.

This is because it is preferable to set the size of one soundproof cell 26 to a size suitable for the frequency of noise since the size of the equipment is determined for the size of general equipment. For this purpose, it is often necessary to shield (that is, reflect and/or absorb) noise with the frame body 16 obtained by combining a plurality of soundproof cells 26. On the other hand, by increasing the number of soundproof cells 26 too much, the total mass is increased by the mass of the rigid frame 14. On the other hand, in a structure such as a partition that is not limited in size, it is possible to freely select the number of rigid frames 14 according to the required overall size.

In addition, since one soundproof cell 26 has one rigid frame 14 as a constitutional unit, the number of rigid frames 14 of the soundproof structure 10 of the present invention can be said to be the number of soundproof cells 26.

The material of the rigid frame 14 (that is, the material of the frame body 16) is not particularly limited as long as the material can support the film 18, has a suitable strength when being applied to the above soundproofing target, and is resistant to the soundproof environment of the soundproofing target, and can be selected according to the soundproofing target and the soundproof environment. For example, as materials of the rigid frame 14, metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamideide, polyarylate, polyether imide, polyacetal, polyether ether ketone, polyphenylene sulfide, polysulfone, polyethylene terephthalate, polybutylene terephthalate, polyimide, and triacetyl cellulose, carbon fiber reinforced plastic (CFRP), carbon fiber, and glass fiber reinforced plastic (GFRP) can be mentioned.

A plurality of materials of the rigid frames 14 may be used in combination.

The materials of the rigid frames 14a and 14b may be the same, or may be different. However, from the ease of adjustment of the cutoff frequency, it is preferable that the materials of the rigid frames 14a and 14b are the same.

The two films 18 (18a and 18b) are laminated, and are fixed by being interposed between the two rigid frames 14 (14a and 14b) so as to be restrained from the outer side so as to cover the opening portion 12 (12a and 12b) inside each of the two rigid frames 14 (14a and 14b). As a result, the two film 18 are regarded as one film, as in the close contact laminated film 21 in the examples shown in FIG. 2, FIG. 4A and FIG. 4D. The two films 18 vibrate as one film in response to sound waves from the outside to absorb or reflect the energy of sound waves, thereby insulating sound. For this reason, it is preferable that the film 18 is impermeable to air.

Incidentally, it is necessary for the two films 18 to vibrate as a unit, that is, as one film, with the rigid frame 14 as a node. For this reason, it is necessary that the two films 18 are fixed so as to be reliably restrained by the rigid frame 14 and serve as antinodes of film vibration, thereby absorbing or reflecting the energy of sound waves to insulate sound. Therefore, it is preferable that the film 18 is formed of a flexible elastic material.

For this reason, the shape of the film 18 is the shape of the opening portion 12 of the rigid frame 14. In addition, the size of the film 18 is the size of the rigid frame 14. More specifically, the size of the film 18 can be said to be the size of the opening portion 12 of the rigid frame 14.

Here, the two films 18a and 18b fixed to the two rigid frames 14a and 14b of the single soundproof cell 26 from the outer side have a first natural vibration frequency at which the transmission loss is the minimum (for example, 0 dB) as a resonance frequency that is a frequency of the lowest order natural vibration mode in which film vibration as one film occurs. In the present invention, the first natural vibration frequency is determined by the structure configured to include the rigid frames 14a and 14b and the films 18a and 18b. Therefore, the present inventors have found that the first natural vibration frequency becomes approximately the same value regardless of the presence or absence of the holes 22a and 22b drilled in the films 18a and 18b.

Here, the first natural vibration frequency in the structure configured to include the rigid frame 14 and the film 18 is the first natural vibration frequency of the film 18 fixed so as to be restrained by the rigid frame 14. The first natural vibration frequency is a frequency of the natural vibration mode at which the sound wave most vibrates the film due to the resonance phenomenon. The sound wave is largely transmitted at the frequency.

Figure 7:
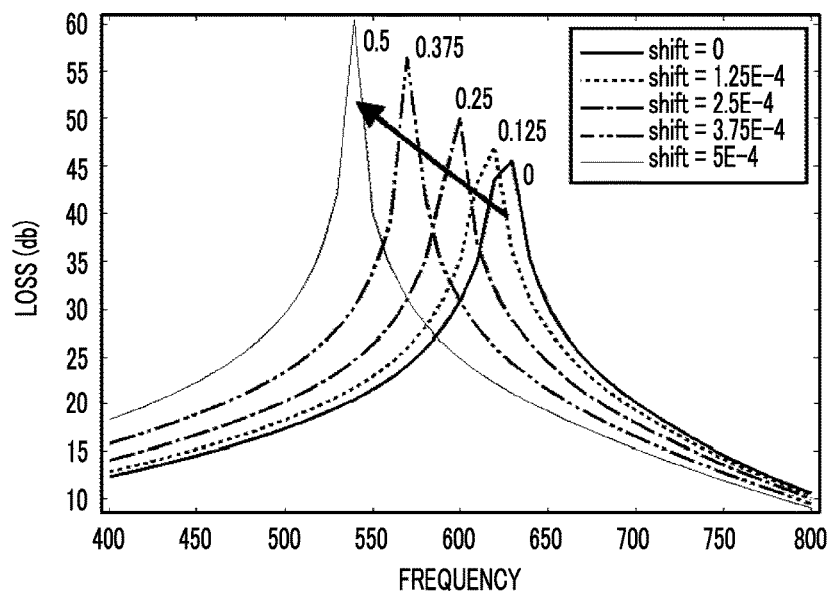
FIG. 7 is a graph showing the sound insulation characteristics of various forms before and after adjustment of the soundproof structure shown in FIGS. 5 and 6.

In the soundproof structures 10 and 11A of the present invention, the holes 22a and 22b are drilled in the films 18a and 18b, respectively, and the films 18a and 18b are fixed to the rigid frames 14a and 14b in a state in which the films 18a and 18b move so that the hole 22a of the film 18a and the hole 22b of the film 18b overlap each other to change the relative position relationship. As a result, in the close contact laminated film 21 in which the films 18a and 18b are integrated, the through-hole 24 is formed by the holes 22a and 22b. For this reason, in the soundproof structures 10 and 11A, as shown in FIG. 7, a shielding peak of the sound wave whose transmission loss is a peak (maximum) appears at the shielding peak frequency on the lower frequency side than the first natural vibration frequency. In particular, on the lower frequency side than the peak of shielding caused by the through-hole 24, an increase in sound absorption due to the presence of the through-hole 24 appears.

Accordingly, the soundproof structures 10 and 11A of the present invention transmit the sound having the first natural vibration frequency, but the shielding (transmission loss) becomes a peak (maximum) at the shielding peak frequency. As a result, it is possible to selectively insulate sound in a predetermined frequency range centered on the shielding peak frequency.

In the present invention, it is possible to increase the shielding of sound and to control the peak of shielding. In addition to these features, there is a feature that the absorption of sound (energy of sound waves) appears on the lower frequency side due to the effect of the through-hole 24.

From the findings of the present inventors, the present inventors believe that, in a case where the size of the rigid frame 14 and the size of the through-hole 24 are both sufficiently smaller than the wavelength of the sound, diffraction and scattering of sound does not occur and a function as an acoustic metamaterial is realized.

In addition, the present inventors believe that the transmitted sound is insulated by causing interference to cancel out the air propagating sound passing through the through-hole 24 and the vibration radiated sound passing through the films 18a and 18b regarded as one film by vibrating the films 18a and 18b. This sound insulation can be considered as follows. The phase of the air propagating sound advances by 90° after the air propagating sound passes through the through-hole 24, and the phase of the vibration radiated sound is delayed by 90° due to the film vibration of the films 18a and 18b regarded as one film having the through-hole 24. Therefore, the vibration radiated sound and the air propagating sound passing through the acoustic metamaterial are canceled each other, and the transmitted sound is insulated.

It is thought that the phase of the vibration radiated sound is delayed by 90° because the film vibration does not occur within the mass law region on the higher frequency side than the first natural vibration frequency but occurs within the stiffness law region on the lower frequency side than the first natural vibration frequency and accordingly the sound insulation peak frequency appears within the stiffness law region.

For example, FIG. 7 shows the result of simulation by the present inventors. In this simulation, the rigid frames 14a and 14b are 50 mm×50 mm in size, the films 18a and 18b having the same configuration are both 0.1-mm thin films of polyethylene terephthalate (PET), and the amount of shift between the films 18a and 18b is 0 mm to 0.5 mm (0 mm, 0.125 mm, 0.25 mm, 0.375 mm, and 0.5 mm).

The acoustic structure coupled analysis simulation for calculating the transmission loss (dB) in the soundproof structure of the present invention is performed as follows.

Since the system of the soundproof structure of the present invention is an interaction system of film vibration and sound waves in air, analysis is performed using coupled analysis of sound and vibration. Specifically, designing is performed using an acoustic module of COMSOL ver 5.0 that is analysis software of the finite element method. First, a first natural vibration frequency is calculated by natural vibration analysis. Then, by performing acoustic structure coupled analysis based on frequency sweep in the periodic structure boundary, transmission loss at each frequency with respect to the sound wave incident from the front is calculated.

In the simulation result shown in FIG. 7, the first natural vibration frequency is in a frequency range exceeding 800 Hz in the audible range, and shows a shielding peak at which the peak value of transmission loss at 535 Hz to 635 Hz (535 Hz, 560 Hz, 600 Hz, 620 Hz, and 635 Hz), which are shielding peak frequencies on the lower frequency side, is about 46 dB to about 60 dB (60 dB, 56 dB, 50 dB, 47 dB, and 46 dB). Therefore, it is possible to selectively insulate sound in a predetermined frequency range centered on each shielding peak frequency of 535 Hz to 635 Hz (535 Hz, 560 Hz, 600 Hz, 620 Hz, and 635 Hz) within the audible range.

The transmission loss at the respective shielding peak frequencies of 535 Hz to 635 Hz on the low frequency side and within the audible range with respect to the first natural vibration frequency exceeding 800 Hz in the audible range shows about 60 dB to about 46 dB. Therefore, it is possible to selectively insulate sound in a predetermined frequency range centered on each shielding peak frequency.

Incidentally, in the structure configured to include the rigid frames 14a and 14b and the films 18a and 18b regarded as one film, in order to set the shielding peak frequency depending on the through-hole 24 formed by the holes 22a and 22b to any frequency within the audible range, it is important to obtain the natural vibration mode on the high frequency side if possible. In particular, this is practically important. Therefore, it is preferable to increase the thickness (that is, the total thickness of the films 18a and 18b) of the films regarded as one film. In addition, it is preferable to increase the Young's modulus of the material of the films 18a and 18b. In addition, it is preferable to reduce the size of the rigid frame 14 (that is, the size of the film 18) as described above. That is, in the present invention, these preferable conditions are important.

Therefore, the soundproof structures 10 and 11A of the present invention comply with the stiffness law. The soundproof structures 10 and 11A cause shielding of sound waves at frequencies lower than the first natural vibration frequency of the films 18a and 18b regarded as one film fixed to the rigid frame 14 (14a and 14b). For this reason, the first natural vibration frequency of the films 18a and 18b is preferably 10 Hz to 100000 Hz corresponding to the sound wave sensing range of a human being. The first natural vibration frequency is more preferably 20 Hz to 20000 Hz that is the audible range of sound waves of a human being, even more preferably 40 Hz to 16000 Hz, most preferably 100 Hz to 12000 Hz.

The thickness of the films regarded as one film (the total thickness of the films 18a and 18b) is not particularly limited as long as the film can vibrate by absorbing or reflecting the energy of sound waves to insulate sound. However, it is preferable to make the film thick in order to obtain the natural vibration mode on the high frequency side. For example, the total thickness of the films 18a and 18b can be set according to the size of the rigid frame 14 (that is, the size of the film).

For example, in a case where the size of the rigid frame 14 is 0.5 mm to 50 mm, the total thickness of the films 18a and 18b is preferably 0.005 mm (5 μm) to 5 mm, more preferably 0.007 mm (7 μm) to 2 mm, and most preferably 0.01 mm (10 μm) to 1 mm.

In a case where the size of the rigid frame 14 exceeds 50 mm and is equal to or less than 200 mm, the total thickness of the films 18a and 18b is preferably 0.01 mm (10 μm) to 20 mm, more preferably 0.02 mm (20 μm) to 10 mm, and most preferably 0.05 mm (50 μm) to 5 mm.

The total thickness of the films 18a and 18b is preferably expressed by an average thickness, for example, in a case where the total thickness of the films 18a and 18b are different in one soundproof cell 26 or in a case where the films 18a and 18b having different total thicknesses are included in each soundproof cell 26.

In the present invention, since the influence on the cutoff frequency is the total thickness of the films 18a and 18b, the thickness of each of the films 18a and 18b is not particularly limited and may be any thickness as long as the total thickness is within the above range. However, it is preferable that the films 18a and 18b have the same thickness.

In the soundproof structures 10 and 11A of the present invention, the first natural vibration frequency of the films 18a and 18b in the structure configured to include the rigid frames 14a and 14b and the films 18a and 18b can be determined by the geometric form of the rigid frame 14 of the soundproof cell 26 and the combined stiffness of the films 18a and 18b of the soundproof cell 26. As the geometric form of the rigid frame 14, for example, the shape and size of the rigid frame 14 can be mentioned. As the combined stiffness of the films 18a and 18b, for example, the total thickness of the films 18a and 18b and the combined flexibility can be mentioned.

As a parameter characterizing the first natural vibration mode of the films 18a and 18b, in the case of the films 18a and 18b of the same material, a ratio $[a^2/t]$ between the total thickness (t) of the films 18a and 18b and the square of the size (a) of the rigid frame 14 can be used. For example, in a case where the rigid frame 14 is a square, the size (a) of the rigid frame 14 is the size of one side.

In a case where the ratio [$a^2/t$] is the same, the first natural vibration mode is the same frequency (that is, the same first natural vibration frequency). Examples of the case where the ratio [$a^2/t$] is the same include a case where (t, a) is (50 μm, 7.5 mm) and a case where (t, a) is (200 μm, 15 mm). That is, by setting the ratio [$a^2/t$] to a fixed value, the scale law is established. Accordingly, an appropriate size can be selected.

The Young's modulus of one film as a combination of the films 18a and 18b is not particularly limited as long as the films 18a and 18b have elasticity capable of vibrating in order to insulate sound by absorbing or reflecting the energy of sound waves. However, it is preferable to set the Young's modulus of the film to be large in order to obtain the natural vibration mode on the high frequency side. In the present invention, for example, the Young's modulus of one film as a combination of the films 18a and 18b can be set according to the size of the rigid frame 14 (that is, the size of the film 18).

For example, the Young's modulus of one film as a combination of the films 18a and 18b is preferably 1000 Pa to 3000 GPa, more preferably 10000 Pa to 2000 GPa, and most preferably 1 MPa to 1000 GPa.

The Young's modulus of each of the films 18a and 18b is not particularly limited and may be any thickness as long as the Young's modulus of one film as a combination of the films 18a and 18b is within the above range. However, it is preferable that the Young's moduli of the films 18a and 18b are the same value.

The density as one film as a combination of the films 18a and 18b is not particularly limited as long as the film can vibrate by absorbing or reflecting the energy of sound waves to insulate sound. For example, the density as one film as a combination of the films 18a and 18b is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

The density of each of the films 18a and 18b is not particularly limited and may be any thickness as long as the density of one film as a combination of the films 18a and 18b is within the above range. However, it is preferable that the densities of the films 18a and 18b are the same value.

In a case where a film-shaped material or a foil-shaped material is used as a material of the film 18 (18a and 18b), the material of the film 18 is not particularly limited as long as the material has a strength in the case of being applied to the above soundproofing target and is resistant to the soundproof environment of the soundproofing target so that the film 18 can vibrate by absorbing or reflecting the energy of sound waves to insulate sound. The material of the film 18 can be selected according to the soundproofing target, the soundproof environment, and the like. For example, as materials of the film 18, resin materials that can be made into a film shape, metal materials that can be made into a foil shape, fibrous materials such as paper and cellulose, and materials capable of forming a thin structure such as a nonwoven fabric, a film containing nano-sized fiber, porous materials including thinly processed urethane or synthrate, and carbon materials processed into a thin film structure can be mentioned.

As resin material, for example, polyethylene terephthalate (PET), polyimide, polymethylmethacrylate, polycarbonate, acrylic (PMMA), polyamideide, polyarylate, polyetherimide, polyacetal, polyetheretherketone, polyphenylene sulfide, polysulfone, polybutylene terephthalate, triacetyl cellulose, polyvinylidene chloride, low density polyethylene, high density polyethylene, aromatic polyamide, silicone resin, ethylene ethyl acrylate, vinyl acetate copolymer, polyethylene, chlorinated polyethylene, polyvinyl chloride, polymethyl pentene, and polybutene can be mentioned.

As metal materials, for example, aluminum, chromium, titanium, stainless steel, nickel, tin, niobium, tantalum, molybdenum, zirconium, gold, silver, platinum, palladium, iron, copper, and permalloy can be mentioned.

The materials of the films 18a and 18b may be the same or may be different. In a case where the ease of adjustment of the cutoff frequency is taken into consideration, it is preferable that the materials of the films 18a and 18b are the same. In a case where the materials of the films 18a and 18b are different, it is preferable to use the physical property values or mechanical properties of the material by converting the physical property values or mechanical properties into physical property values or mechanical properties of the material as one film in a case where the films 18a and 18b are regarded as one film.

In the soundproof structure 11A, it is preferable to form films 18a and 18b covering the respective rigid frames 14a and 14b by using the one-sheet-shaped film bodies 20a and 20b fixed so as to cover all the rigid frames 14a and 14b. In the case of the film 18a, the film 18a may be separately fixed to each of a plurality of rigid frames 14a of the frame body 16 in advance to form the sheet-shaped film body 20a as a whole. Alternatively, the film 18a covering each rigid frame 14a may be formed by fixing the sheet-shaped film body to some of the rigid frames 14a so as to cover some of the plurality of rigid frames 14a, and the sheet-shaped film body 20a covering all of the plurality of rigid frames 14a (all the rigid frames 14a) may be formed by using some of the sheet-shaped film bodies.

The method of fixing the film 18a to the rigid frame 14a is not particularly limited. Any method may be used as long as the film 18a can be fixed so that the rigid frame 14a serves as a node of film vibration. For example, a method using an adhesive, a method using a physical fixture, and the like can be mentioned.

In the method of using an adhesive, the adhesive is applied onto the surface surrounding the opening portion 12a of the rigid frame 14a and the film 18a is placed thereon, so that the film 18a is fixed to the rigid frame 14a with the adhesive. Examples of the adhesive include epoxy-based adhesives (Araldite (registered trademark) and the like), cyanoacrylate-based adhesives (Aron Alpha (registered trademark) and the like), acrylic-based adhesives, and the like.

As a method using a physical fixture, a method can be mentioned in which the film 18a disposed so as to cover the opening portion 12a of the rigid frame 14a is interposed between the rigid frame 14a and a fixing member, such as a rod, and the fixing member is fixed to the rigid frame 14a by using a fixture, such as a screw.

In order to interpose and fix the films 18a and 18b between the rigid frames 14a and 14b by bringing the film 18b into contact with the film 18a supported by the rigid frame 14a or bringing the film 18b close to the film 18a supported by the rigid frame 14a by a distance regarded as one film or less using the rigid frame 14b as a presser against the film 18b, the rigid frame 14b may be mechanically pressed using a pressing device, such as a plunger, or the rigid frames 14a and 14b may be fixed using a physical fixture.

The film 18 (18a and 18b) has the hole 22 (22a and 22b), and has the through-hole 24 formed by the hole 22 (that is, by overlapping of the holes 22a and 22b). As a result, the soundproof cell 26 has the through-hole 24.

In the present invention, the soundproof structures 10 and 11A have the through-hole 24 formed by the holes 22a and 22b drilled in the films 18a and 18b. As a result, the soundproof structures 10 and 11A have a peak of transmission loss at which shielding is a peak (maximum) on the lower frequency side than the first natural vibration frequency by the films 18a and 18b regarded as one film. The frequency at which shielding (transmission loss) is a peak (maximum) is referred to as a shielding peak frequency.

The shielding peak frequency appears, due to the through-hole 24 by the overlapping of the holes 22a and 22b, on the lower frequency side than the first natural vibration frequency that mainly depends on the films 18a and 18b regarded as one film of the soundproof cell 26 of the soundproof structures 10 and 11A. The shielding peak frequency is determined according to the size of the through-hole 24 with respect to the size of the rigid frames 14a and 14b (or the films 18a and 18b). Specifically, the shielding peak frequency is determined according to the opening ratio that is the ratio of the area of the through-hole 24 to the area of the opening portion 12 (or the film 18 covering the opening portion 12) of the rigid frame 14.

The hole 22 (22a and 22b) is drilled at a position of the film 18 (18a and 18b) corresponding to the opening portion 12 (12a and 12b) of the rigid frame 14 (14a and 14b) of the soundproof cell 26. In this case, it is preferable that the film 18 covers the opening portion 12.

As shown in FIG. 1, FIGS. 3A and 3B, and FIGS. 10, 12, 14, and 16, the drilling position of the hole 22 (22a and 22b) may be the middle of the film 18 (18a and 18b) of the soundproof cell 26 or the middle in a case where the film 18b is moved. However, the present invention is not limited thereto. As shown in FIG. 15, the drilling position of the hole 22 (22a and 22b) does not need to be the middle of the film 18 of the soundproof cell 26 or the middle in a case where the film 18b is moved, and the hole 22 (22a and 22b) may be drilled at any position.

That is, the sound insulation characteristics of the soundproof structures 10 and 11A of the present invention are not changed simply by changing the drilling position of the hole 22 (22a and 22b).

However, it is preferable that the drilling position of the hole 22 (22a and 22b) is a position set such that the position of the through-hole 24 is a region excluding a region within the range of 20% of the size of the surface of the film 18 (18a and 18b) from the inner side end surface (that is, a peripheral portion of the opening portion 12 (12a and 12b)) of the rigid frame 14 (14a and 14b).

As shown in FIG. 1, FIGS. 3A and 3B, and FIGS. 10, 12, 14, and 16, the number of holes 22 (22a and 22b) (that is, the number of through-holes 24) in the opening portion 12 (12a and 12b) of the rigid frame 14 (14a and 14b) of the soundproof cell 26 may be one for one soundproof cell 26. However, the present invention is not limited thereto, and two or more (that is, a plurality of) holes 22 (22a and 22b) may be provided as shown in FIG. 15.

In the soundproof structures 10 and 11A of the present invention, from the viewpoint of air permeability, it is preferable that the number of holes 22 and the number of through-holes 24 in one soundproof cell 26 are one. The reason is that, in a case where the through-hole 24 has a predetermined opening ratio, the ease of passage of air as wind is large in a case where one hole 22 is large and, as a result, the through-hole 24 is large and the viscosity at the boundary does not work greatly.

On the other hand, in a case where a plurality of holes 22 and a plurality of through-holes 24 are present in one soundproof cell 26, the sound insulation characteristics of the soundproof structures 10 and 11A of the present invention indicate sound insulation characteristics corresponding to the total area of the plurality of through-holes 24 (that is, a corresponding sound insulation peak at the corresponding sound insulation peak frequency). In the present invention, therefore, from the ease of adjustment of the cutoff frequency, it is preferable that the number of holes 22 and the number of through-holes 24 in one soundproof cell 26 are one. The reason is that, in a case where there are a plurality of through-holes 24, it is necessary to calculate the total area of the plurality of formed through-holes 24 for each relative movement amount (that is, shift amount) between the film 18a and the film 18b.

In addition, as shown in FIG. 15, it is preferable that the total area of the plurality of through-holes 24 by the plurality of holes 22 in one soundproof cell 26 is equal to the area of one through-hole 24 by one hole 22 in another soundproof cell 26 that has only one through-hole 24. However, the present invention is not limited thereto.

In a case where the opening ratio of the through-hole 24 in the soundproof cell 26 (the area ratio of the through-hole 24 to the area of the film 18 covering the opening portion 12 (the ratio of the total area of all the through-holes 24)) is the same, the same soundproof structures 10 and 11A are obtained with the single through-hole 24 by the single hole 22 and the plurality of through-holes 24 by the plurality of holes 22. Therefore, even in a case where the size of the through-hole 24 as a reference is fixed to a certain size, it is possible to manufacture a soundproof structure capable of adjusting the cutoff frequency with various frequency ranges as references.

In the present invention, the opening ratio (area ratio) of the through-hole 24 in the soundproof cell 26 is not particularly limited, and may be set according to the sound insulation frequency range to be selectively insulated. Therefore, the opening ratio of the through-hole 24 is preferably 0.000001% to 70%, more preferably 0.000005% to 50%, and most preferably 0.00001% to 30%. By setting the opening ratio of the through-hole 24 within the above range, it is possible to determine the sound insulation peak frequency, which is the center of the sound insulation frequency band to be selectively insulated, and the transmission loss at the sound insulation peak.

In the soundproof structure 11A of the present invention, from the viewpoint of manufacturing suitability, it is preferable to have one hole 22 of the same size in all the soundproof cells 26.

In addition, in the soundproof structures 10 and 11A of the present invention, from the viewpoint of manufacturing suitability, it is preferable to have a plurality of holes 22 of the same size in one soundproof cell 26.

In addition, in the soundproof structure 11A of the present invention, it is preferable that the holes 22 forming the through-hole 24 of all the soundproof cells 26 have the same size.

In the present invention, it is preferable that the hole 22 is drilled using a processing method for absorbing energy (for example, a laser processing method). Alternatively, it is preferable that the hole 22 is drilled using a mechanical processing method based on physical contact (for example, punching or needle processing).

Therefore, assuming that a plurality of holes 22 in one soundproof cell 26 or one or a plurality of holes 22 in all the soundproof cells 26 have the same size, in the case of drilling holes by laser processing, punching, or needle processing, it is possible to continuously drill holes without changing the setting of a processing apparatus or the processing strength.

As shown in FIGS. 15 and 16, in the soundproof structures 10 and 11A of the present invention, the size of the hole 22 in the soundproof cell 26 (or the film 18) may be different for each soundproof cell 26 (or the film 18). In a case where there are holes 22 having different sizes for each soundproof cell 26 (or the film 18) as described above, it is conceivable that the size of the through-hole 24 formed by the holes 22 is also different for each soundproof cell 26 (or the film 18). However, the soundproof structures 10 and 11A of the present invention show sound insulation characteristics corresponding to the average area of the areas of the through-holes 24 (that is, a corresponding sound insulation peak at the corresponding sound insulation peak frequency).

In addition, it is preferable that 70% or more of the holes 22 of each soundproof cell 26 of the soundproof structure 11A of the present invention are formed as holes having the same size.

The size of the hole 22 may be any size as long as the hole 22 can be appropriately drilled by the above-described processing method, and is not particularly limited.

However, from the viewpoint of processing accuracy of laser processing such as accuracy of laser diaphragm, processing accuracy of punching or needle processing, manufacturing suitability such as easiness of processing, and the like, the size of the hole 22 on the lower limit side thereof is preferably 2 µm or more, more preferably 5 µm or more, and most preferably 10 µm or more.

The upper limit of the sizes of these holes 22 needs to be smaller than the size of the rigid frame 14. Usually, in a case where the size of the rigid frame 14 is set to the order of mm and the size of the hole 22 is set to the order of µm, the upper limit of the size of the hole 22 does not exceed the size of the rigid frame 14. In a case where the upper limit of the size of the hole 22 exceeds the size of the rigid frame 14, the upper limit of the size of the hole 22 may be set to be equal to or less than the size of the rigid frame 14.

It is preferable that the size of the hole 22 is 0.1 mm or more and 10 mm or less. The shape of the hole 22 is not particularly limited like the shape of the film 18. For example, the shape of the hole 22 can be appropriately selected from a circle, an ellipse, a polygon such as a quadrangle, and the like.

The pitch (distance between centers) between the holes 22 is not particularly limited, and any distance may be set as long as one or more holes 22 are drilled in the film 18 of each rigid frame 14. In the present invention, since the hole 22 may be located anywhere in the film 18 of each rigid frame 14, it can be said that the pitch (distance between centers) between the holes 22 is not limited in a case where the hole 22 can be drilled.

The degree of overlapping of one or more holes of each of two or more films (for example, the degree of overlapping of the hole 22a of the film 18a and the hole 22b of the film 18b) may be adjusted according to the cutoff frequency of the sound to be selectively blocked.

Incidentally, in the soundproof structure 10 shown in FIG. 1, the two films 18a and 18b are brought into close contact with each other or are kept below a distance at which the near field of sound reaches (that is, a distance that can be regarded as one film). However, the present invention is not limited thereto. In order to prevent the two films 18a and 18b from being in close contact with each other, as shown in the soundproof structure 11B shown in FIG. 8, a spacer 28 having a size equal to or less than the distance at which the near field of sound reaches (that is, the distance that can be regarded as one film) may be inserted between the two films 18a and 18b.

Specifically, the distance at which the near field of sound reaches (that is, the distance that can be regarded as one film) is preferably about 1/e of the size of the hole 22.

Figure 8:
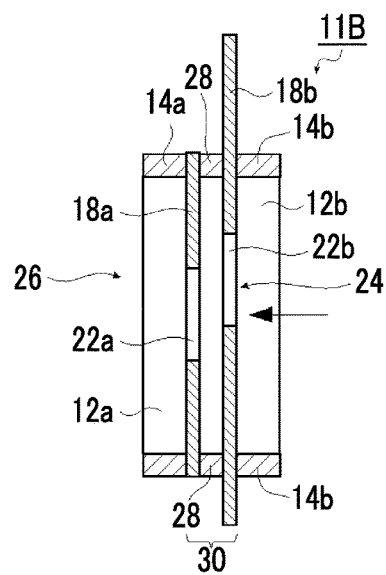
FIG. 8 is a cross-sectional view schematically showing an example of a single soundproof cell of a soundproof structure according to another embodiment of the present invention.

The soundproof structure 11B shown in FIG. 8 has the same configuration as the soundproof structure 10 shown in FIG. 1 except that the spacer 28 is inserted between the two films 18a and 18b so that the two films 18a and 18b are disposed with a predetermined distance therebetween through the spacer 28, and the two films 18a and 18b fixed by the rigid frames 14a and 14b can be regarded as one equivalent film 30. Accordingly, the description will be omitted.

Since it is necessary for the two films 18a and 18b to be brought close to each other by the distance at which the near field of sound that can be regarded as one film reaches or less, the size of the spacer 28 needs to be equal to or less than the distance at which the near field of sound reaches.

The adjustment of the cutoff frequency in the soundproof structure 11B shown in FIG. 8 can be performed as shown in FIGS. 9A, 9B, 9C and 9D.

FIGS. 9A, 9B, 9C and 9D are schematic cross-sectional views showing the progress from the form before adjustment of the cutoff frequency to the form after adjustment of the soundproof structure shown in FIG. 8.

For example, in the form before adjustment of the soundproof structure 11B shown in FIG. 9A, the rigid frames 14a and 14b fix the films 18a and 18b so as to be interposed therebetween so that the holes 22a and 22b match each other to become the through-hole 24 of the equivalent film 30.

As shown in FIG. 9B, one rigid frame 14b of the rigid frames 14a and 14b in this form is removed from the fixed state, and moves to the outer side (right side in the diagram) with respect to the films 18a and 18b so as to be spaced apart from the films 18a and 18b. In this case, the rigid frame 14b functions as a presser against the film 18b.

In this manner, the film 18b is in contact with the spacer 28 or very close to the spacer 28, but is in a movable state in which the film 18b is not pressed by the rigid frame 14b.

In this case, in order to prevent the film 18b from sticking to the spacer 28, a matte material may be used, or static electricity may be removed in advance by making the film 18b conductive.

Thereafter, as shown in FIG. 9C, the film 18b in the movable state is moved in a direction (upper side in the diagram) parallel to the surface of the film 18a in a state in which the film 18b is in contact with or very close to the spacer 28, thereby changing the relative position relationship between the films 18a and 18b. That is, the film 18b is shifted with respect to the film 18a. In this case, it is necessary to move (shift) the film 18b to a position where the holes 22a and 22b necessarily overlap each other so that the through-hole 24 can be formed.

Finally, as shown in FIG. 9D, the rigid frame 14b is moved to the inner side with respect to the film 18b so as to be brought into contact with the film 18b and used as a presser, and the films 18a and 18b are pressed and fixed from one side or both sides of the rigid frames 14a and 14b in a state in which the films 18a and 18b are interposed between the rigid frames 14a and 14b.

In this manner, the form shown in FIG. 9D can be obtained as, for example, a form after adjustment of the soundproof structure 11B shown in FIG. 8.

The process from the form before adjustment of the cutoff frequency to the form after adjustment of the soundproof structure 11B shown in FIGS. 9A, 9B, 9C and 9D is the same as the process between the forms before and after adjustment of the soundproof structure 10 shown in FIGS. 4A, 4B, 4C and 4D except that the film 18b is spaced apart from the film 18a with the spacer 28 interposed therebetween and moves along the spacer 28. Accordingly, a further detailed explanation will be omitted.

In the example described above, the film 18b is moved directly, for example, by a hand of a person. However, the present invention is not limited thereto, and a moving device for relative movement having a mechanism for moving the film 18b relative to the film 18a may be provided as shown in FIGS. 10 and 11.

Figure 11:
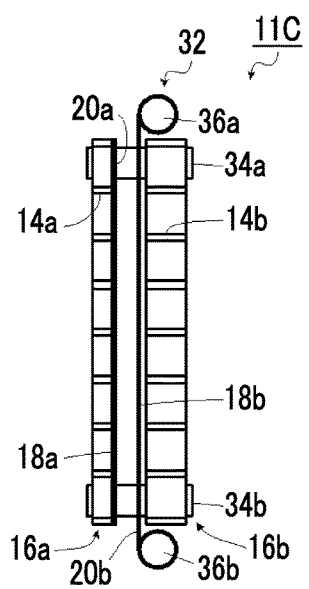
FIG. 11 is a schematic cross-sectional view of the soundproof structure shown in FIG. 10.

FIGS. 10 and 11 are a plan view and a schematic cross-sectional view schematically showing an example of a soundproof structure according to another embodiment of the present invention.

A soundproof structure 11C shown in FIGS. 10 and 11 has a frame body 16a and a frame body 16b, a sheet-shaped film body 20a and a sheet-shaped film body 20b, a moving device 32, and an attaching and detaching device 34 (34a and 34b). The frame body 16a has a plurality (for example, 64) of rigid frames 14a. The frame body 16b has a plurality (for example, 64) of rigid frames 14b. The sheet-shaped film body 20a is configured to include a plurality (for example, 64) of films 18a. The sheet-shaped film body 20b is configured to include a plurality (for example, 64) of films 18b. The moving device 32 moves the film 18b with respect to the film 18a. The attaching and detaching device 34 (34a and 34b) attaches and detaches the frame body 16a to and from the sheet-shaped film body 20b. As described above, the frame body 16a includes a plurality of (for example, 64) rigid frames 14a to which the film 18a is fixed. The sheet-shaped film body 20b includes a plurality of (for example, 64) films 18b supported by the frame body 16b including a plurality of (for example, 64) rigid frames 14b.

The moving device 32 may be a moving device of the present invention for sliding the two films 18 (18a and 18b).

Since the configurations of the rigid frames 14a and 14b, the frame bodies 16a and 16b, the films 18a and 18b, and the sheet-shaped film bodies 20a and 20b of the soundproof structure 11C shown in FIGS. 10 and 11 are the same as those of the soundproof structure 11A shown in FIGS. 5 and 6, the detailed description thereof will be omitted.

The moving device 32 is a second film moving device of the present invention that changes the relationship of the relative position of the film 18b with respect to the film 18a by moving the film 18b of the sheet-shaped film body 20b, which is at least one second film of the present invention, relative to the film 18a of the sheet-shaped film body 20a that is a first film of the present invention.

The moving device 32 has rolls 36a and 36b for winding the sheet-shaped film body 20b including a plurality of films 18b and winding devices 38a and 38b for rotating the rolls 36a and 36b to unwind the sheet-shaped film body 20b wound on one of the rolls 36a and 36b and wind the unwound sheet-shaped film body 20b on the other roll.

The winding devices 38a and 38b have handles 40a and 40b, gears 42a and 42b for rotating the rolls 36a and 36b by transmitting the rotational force of the handles 40a and 40b to the rolls 36a and 36b, and gauges (scales) 44a and 44b attached to the gears 42a and 42b provided on the rolls 36a and 36b, respectively.

In the example shown in FIGS. 10 and 11, the roll 36a is disposed on the upper side in the diagram and the roll 36b is disposed on the lower side in the diagram, so that the sheet-shaped film body 20b is wound on the rolls 36a and 36b.

In the case of adjusting the cutoff frequency, the upper handle 40a is rotated to wind the sheet-shaped film body 20b on the roll 36a and unwind the sheet-shaped film body 20b wound on the roll 36b, thereby moving the sheet-shaped film body 20b upward.

In this case, since the movement amount of the sheet-shaped film body 20b is measured by the gauge 44a provided on the roll 36a and the shift amount of the film 18b with respect to the film 18a can be calculated from the measured movement amount, the size of the through-hole 24 can be calculated and measured from the shift amount.

On the other hand, in the case of moving the sheet-shaped film body 20b downward in order to adjust the cutoff frequency, the lower handle 40b may be rotated to wind the sheet-shaped film body 20b on the roll 36b and unwind the sheet-shaped film body 20b wound on the roll 36a.

Also in this case, the size of the through-hole 24 can be measured by measuring the movement amount of the sheet-shaped film body 20b using the gauge 44b provided on the roll 36b, calculating the shift amount of the hole 22b of the film 18b with respect to the hole 22a of the film 18a from the movement amount, and calculating the overlapping between the holes 22a and 22b from the shift amount.

In the present invention, the attaching and detaching device 34 attaches and detaches at least one rigid frame to and from at least one film of two or more films.

In the example shown in FIG. 11, the attaching and detaching device 34 has a pressure bonding/opening guide. In a case where the soundproof structure 11C is used, the attaching and detaching device 34 moves the frame body 16a including a plurality of rigid frames 14a to which a plurality of films 18a of a sheet-shaped film body 20a are fixed, along the pressure bonding/opening guide, to the right side in the diagram toward the sheet-shaped film body 20b supported by the rolls 36a and 36b. In this manner, the attaching and detaching device 34 press-bonds the sheet-shaped film body 20b to fix the plurality of films 18a (sheet-shaped film body 20a) and 18b (sheet-shaped film body 20b) from the outer side by the rigid frame 14a (frame body 16a) and the rigid frame 14b (frame body 16b).

On the contrary, in the case of adjusting the cutoff frequency of the soundproof structure 11C, the attaching and detaching device 34 moves the frame body 16a with the sheet-shaped film body 20a fixed by the rigid frame 14a (frame body 16a) and the rigid frame 14b (frame body 16b), along the pressure bonding/opening guide, to the left side in the diagram so as to be spaced apart from the sheet-shaped film body 20b. In this manner, the attaching and detaching device 34 releases pressure bonding, so that the sheet-shaped film body 20b can move up and down.

Thereafter, the moving device 32 moves the sheet-shaped film body 20b upward or downward to shift the film 18b with respect to the film 18a, thereby changing the size of the through-hole 24 and adjusting the cutoff frequency.

In the example described above, two films are used. However, the present invention is not limited thereto, and three or more film may be used as shown in FIGS. 12 and 13.

Figure 12:
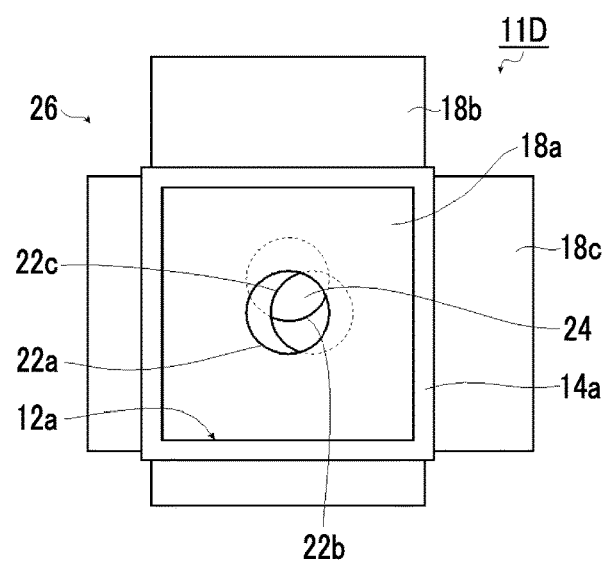
FIG. 12 is a plan view schematically showing an example of a single soundproof cell of a soundproof structure according to another embodiment of the present invention.
Figure 13:
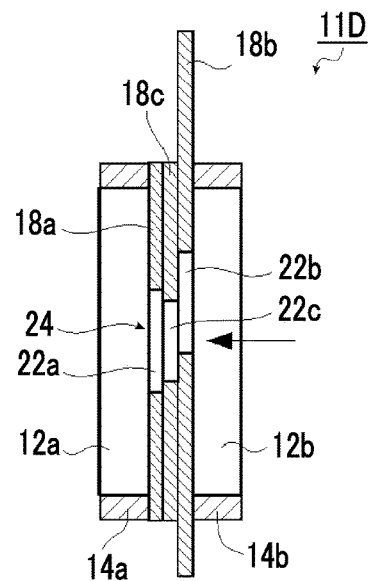
FIG. 13 is a schematic cross-sectional view of the soundproof structure shown in FIG. 12.

FIGS. 12 and 13 are a plan view and a schematic cross-sectional view schematically showing an example of a single soundproof cell of a soundproof structure according to another embodiment of the present invention.

A soundproof structure 11D shown in FIGS. 12 and 13 is obtained by inserting a film 18*c* movable in the left and right directions in the diagrams between the film 18*a* fixed to the rigid frame 14*a* and the film 18*b*, which is movable up and down, in the soundproof structure 10 shown in FIGS. 1 and 2. Therefore, in the soundproof structure 11D, the same components are denoted by the same reference numerals, and the description thereof will be omitted.

In the soundproof structure 11D shown in FIGS. 12 and 13, the hole 22*c* of the film 18*c* is a circle having the same shape and the same size as the hole 22*a* of the film 18*a* and the hole 22*b* of the film 18*b*.

In the soundproof structure 11D, the film 18*c* is moved to the right side in FIG. 12 with respect to the film 18*a* to change (that is, shift) the relative position relationship between the films 18*a* and 18*c*, thereby moving the film 18*b* to the upper side in FIG. 12. As described above, in the soundproof structure 11D, by changing the size of the through-hole 24 by changing (that is, shifting) the relative position relationship between the films 18*a* and 18*b*, the cutoff frequency can be adjusted.

In the present invention, three or more film can be used. Thus, as the number of films increases, it is possible to move a large number of films. Therefore, adjustment of the size of a through-hole due to overlapping of holes drilled in the films may be able to be performed finely. However, since it is necessary to move a large number of films, the operation becomes complicated. In a case where a moving device for moving a large number of films, the configuration becomes complicated.

Therefore, in the present invention, it is preferable to use two films. However, in a case where it is difficult to adjust the cutoff frequency with two films, it is preferable to use three or more films.

Incidentally, in the soundproof structures 10 and 11A of the present invention, the first natural vibration frequency is determined by the structure configured to include the rigid frame 14 and the film 18, and the shielding peak frequency at which the transmission loss reaches its peak is determined depending on the through-hole 24 formed by the holes 22 drilled in the film 18 of the structure configured to include the rigid frame 14 and the film 18.

Therefore, in the soundproof structures 10 and 11A of the present invention, it is important that both the through-hole 24, through which sound can pass as an acoustic wave instead of vibration, and the film 18 (one film in a case where the films 18*a* and 18*b* can be regarded as one film), through which sound passes as film vibration, are present.

Therefore, even in a state in which the through-hole 24 through which sound can pass is covered with a member allowing sound to pass therethrough as an acoustic wave traveling through the air instead of film vibration, it is possible to obtain a peak of sound insulation as in a case where the through-hole 24 is open. Such a member is a generally permeable member.

As a representative member having such air permeability, a mesh net can be mentioned. As an example, an Amidology 30 (product name) mesh product manufactured by NBC Meshtec Inc. can be mentioned. However, the present inventors have confirmed that, even in a case where the through-hole 24 is closed by this, the obtained spectrum does not change.

The net may have a lattice form or a triangular lattice form. In particular, since the net does not depend on its shape, there is no limitation on the net. The size of the entire net may be larger or smaller than the size of the frame body of the present invention. In addition, the size of the net may be a size covering the through-hole 24 of the film 18 in a one-to-one manner. In addition, the net may be a net whose mesh has a size intended for so-called insect repelling, or may be a net that prevents the entry of more fine sand. The material may be a net formed of a synthetic resin, or may be a wire for crime prevention or radio wave shielding.

In addition, the above-described permeable member is not limited to the mesh net. In addition to the net, a nonwoven fabric material, a urethane material, Synthrate (trademark) (manufactured by 3M Company), Breath Air (trademark) (manufactured by Toyobo Co., Ltd.), Dot Air (trademark) (manufactured by Toray Industries, Inc.), and the like can be mentioned. In the present invention, by covering the through-hole 24 with such a material having air permeability, it is possible to prevent insects and sand from passing through the hole, to ensure the privacy such that the inside can be seen from a part of the through-hole 24, and to ensure hiding.

Incidentally, the soundproof structure of the present invention may have the following features.

The soundproof structure of the present invention has two or more films, which include holes and are laminated in the relative position relationship in which the holes overlap each other, and two rigid frames that fix the two or more laminated films so as to be interposed from both sides. The two or more films have one first film and at least one second film among the remaining films, which can move relative to the first film and which changes the relationship of the relative position with respect to the first film. In the soundproof structure of the present invention, at least one second film is moved relative to the first film so as to change the relative position relationship in which the holes of two or more films overlap each other. Two or more films are disposed in contact with each other or spaced apart from each other by a distance within a range where the near field of sound can reach in the relative position relationship. By changing the relative position relationship between two or more films, the size of a through-hole formed by the overlapping holes of the two or more laminated films is changed. In this manner, the size of the through-hole, mechanical properties in a case where the two or more laminated films are regarded as one film, and the cutoff frequency of sound depending on the structure of two rigid frames is adjusted.

Here, two or more films may form one close contact laminated film by being laminated in close contact with each other. Alternatively, it is preferable that two or more films include a spacer, which makes adjacent films spaced apart from each other by a distance within a range where the near field of sound can reach. The distance between the adjacent films spaced apart from each other by the spacer may be 100 μm or less.

In addition, at least one rigid frame of two rigid frames may be attachable and detachable from at least one film of two or more films. At the time of use, at least one rigid frame may be attached, and two or more films may be interposed by two rigid frames. At the time of adjustment, at least one rigid frame may be detached and at least one second film may be moved relative to the first film, thereby changing the relative position relationship between two or more films.

In addition, an attaching and detaching device that attaches and detaches at least one rigid frame to and from at least one film of two or more films may be further provided.

In addition, a moving device for relative movement of a second film that moves at least one second film relative to the first film to change the relationship of the relative position of at least one second film with respect to the first film may be further provided. The moving device may change the relative position relationship between two or more films.

The moving device for relative movement may have a roll for winding the first film, or one film of at least one second film, or at least two films of the first film and at least one second film and a winding device for winding the first film, one film of at least one second film, or two films of the first film and one film of at least one the second film on the roll by rotating the roll. At the time of adjustment, the relative position relationship between the two or more films may be changed by winding up the roll with a winding device. The moving device for relative movement may further include a gauge provided on the roll, and the movement amount of the first film or at least one second film and the size of the through-hole may be measured by the gauge.

The soundproof structure of the present invention is basically configured as described above.

Since the soundproof structure of the present invention is configured as described above, the soundproof structure of the present invention has features that it is possible to perform low frequency shielding, which has been difficult in conventional soundproof structures, and that it is possible to design a structure capable of strongly insulating noise of various frequencies from low frequencies to frequencies exceeding 1000 Hz. In addition, since the soundproof structure of the present invention is based on the sound insulation principle independent of the mass of the structure (mass law), it is possible to realize a very light and thin sound insulation structure compared with conventional soundproof structures. Therefore, the soundproof structure of the present invention can also be applied to a soundproof target which is difficult to sufficiently insulate with the conventional soundproof structures.

The soundproof structure of the present invention has a feature that a weight is not required unlike in the technique disclosed in U.S. Pat. No. 7,395,898B (corresponding Japanese Patent Application Publication: JP2005-250474A) and that a sound insulation structure with manufacturing suitability and high robustness as a sound insulation material is obtained simply by providing a through-hole in a film. That is, the soundproof structure of the present invention has the following features compared with the technique disclosed in U.S. Pat. No. 7,395,898B (corresponding Japanese Patent Application Publication: JP2005-250474A).

1. Since it is not necessary to use a weight that causes an increase in the mass, it is possible to realize a lighter sound insulation structure.

2. Since a hole can be formed in a film quickly and easily by laser processing or punch holes, there is manufacturing suitability.

3. Since the sound insulation characteristic hardly depends on the position or the shape of a through-hole depending on the position and the shape of a hole, stability is high in manufacturing.

4. A film has air permeability since a through-hole is present. That is, it is possible to realize a structure that shields sound while allowing wind and heat to pass therethrough.

In the soundproof structure of the present invention, a plurality of different thin films in which holes having a predetermined size are provided are laminated so as to be brought into contact with each other or be spaced apart from each other by the distance within the range where the near field of sound can reach in the relative position relationship in which the holes overlap each other, and are fixed by rigid frames having a predetermined size. In this case, in the soundproof structure of the present invention, by changing the relative position relationship between the holes of different films to change the size of the through-hole formed by the overlapping holes, it is possible to adjust the specific cutoff frequency of the sound depending on the size of the through-hole, the mechanical constant properties of the laminated film in which a plurality of thin films are laminated, and the structure of the rigid frame.

In the adjustment method of a soundproof structure of the present invention, in the soundproof structure of the present invention, the relative positions of two or more films are changed by moving at least one film of the two or more films of the laminated film, thereby adjusting the hole size of the through-hole formed by the overlapping of one or more holes of the two or more films of the laminated film.

The adjustment method of a soundproof structure executed in the soundproof structure 11C shown in FIGS. 10 and 11 will be described below.

First, the frame body 16a including 64 rigid frames 14a to which the 64 films 18a of the sheet-shaped film body 20a are fixed, and the frame body 16b including 64 rigid frames 14b, are removed from the sheet-shaped film body 20b.

Then, for example, the roll 36a is rotated clockwise by the handle 40a to wind up the sheet-shaped film body 20b, and the position of the hole 22b of each film 18b of the sheet-shaped film body 20b is moved upward by a predetermined amount. In this case, the roll 36a also rotates to unwind the sheet-shaped film body 20b. By shifting the position of the hole 22b of each film 18b of the sheet-shaped film body 20b with respect to the position of the hole 22a of each film 18a of the sheet-shaped film body 20a by the predetermined amount as described above, the relative positions of the films 18a and 18b are changed. Accordingly, the relative positions of the holes 22a and 22b are changed by the predetermined amount.

In this manner, the size of the through-hole 24 formed by the overlapping of the holes 22a and 22b is adjusted according to the cutoff frequency of the sound to be selectively blocked.

After adjusting the size of the through-hole 24, the movement amount of the sheet-shaped film body 20b (that is, the movement amount of each film 18b) is measured by the gauge 44a or 44b, and the size of the through-hole 24 is measured. In a case where the measured size of the through-hole 24 appropriately corresponds to the cutoff frequency of the sound to be selectively blocked, the frame body 16a is moved to the side of the sheet-shaped film body 20b and the frame body 16b so that the sheet-shaped film body 20a and the sheet-shaped film body 20b that are fixed to the frame body 16a are brought into close contact with each other. Then, the sheet-shaped film bodies 20a and 20b that are brought into close contact with each other are fixed in a state in which the sheet-shaped film bodies 20a and 20b are interposed between the frame bodies 16a and 16b.

In this manner, according to the adjustment method of a soundproof structure of the present invention, it is possible to adjust the soundproof structure of the present invention to the cutoff frequency of the sound to be selectively blocked.

The adjustment method of a soundproof structure of the present invention is basically configured as described above.

While the soundproof structure and the adjustment method of a soundproof structure of the present invention have been described in detail with reference to various embodiments and examples, the present invention is not limited to these embodiments and examples, and various improvements or modifications may be made without departing from the scope and spirit of the present invention.

EXPLANATION OF REFERENCES 10, 11A, 11B, 11C, 11D: soundproof structure
12, 12a, 12b: opening portion
14, 14a, 14b: rigid frame
16, 16a, 16b: frame body
18, 18a, 18b, 18c: film
20, 20a, 20b: film body
21: close contact laminated film
22, 22a, 22b, 22c: hole
24: through-hole
26: soundproof cell
28: spacer
30: equivalent film
32: moving device
34: attaching and detaching device
36a, 36b: roll
38a, 38b: winding device
40a, 40b: handle
42a, 42b: gear
44a, 44b: gauge (memory)

What is claimed is:

1. A soundproof structure, comprising:
a laminated film in which two or more films each comprising one or more holes drilled therein are laminated; and
two rigid frames that fix the laminated film so as to be interposed from both sides of the laminated film,
wherein at least parts of the one or more holes in the respective films of the laminated film overlap each other, and
wherein each rigid frame includes an opening portion which passes through each rigid frame.

2. The soundproof structure according to claim 1, wherein two adjacent films of the two or more films are spaced apart from each other by a spacer.

3. The soundproof structure according to claim 1, wherein the two or more films are spaced apart from each other at distances of 100 μm or less.

4. The soundproof structure according to claim 2, wherein the two or more films are spaced apart from each other at distances of 100 μm or less.

5. The soundproof structure according to claim 1, wherein at least one film of the two or more films is movable, and
at least one rigid frame of the two rigid frames is attachable and detachable at the time of movement of the at least one film.

6. The soundproof structure according to claim 2, wherein at least one film of the two or more films is movable, and
at least one rigid frame of the two rigid frames is attachable and detachable at the time of movement of the at least one film.

7. The soundproof structure according to claim 3, wherein at least one film of the two or more films is movable, and
at least one rigid frame of the two rigid frames is attachable and detachable at the time of movement of the at least one film.

8. The soundproof structure according to claim 4, wherein at least one film of the two or more films is movable, and
at least one rigid frame of the two rigid frames is attachable and detachable at the time of movement of the at least one film.

9. The soundproof structure according to claim 1, wherein a size of a cell surrounded by each rigid frame of the two rigid frames is smaller than a wavelength of sound.

10. The soundproof structure according to claim 2, wherein a size of a cell surrounded by each rigid frame of the two rigid frames is smaller than a wavelength of sound.

11. The soundproof structure according to claim 3, wherein a size of a cell surrounded by each rigid frame of the two rigid frames is smaller than a wavelength of sound.

12. The soundproof structure according to claim 1, wherein sizes of the one or more holes are 0.1 mm or more and 10 mm or less.

13. The soundproof structure according to claim 1, wherein one film of the two or more films is movable relative to remaining films other than the one film, and
a through-hole formed by overlapping of the one or more holes of the two or more films of the laminated film has a hole size adjusted according to a relative movement amount of the one film with respect to the remaining films.

14. The soundproof structure according to claim 13, further comprising:
a moving device that moves the one film relative to the remaining films.

15. The soundproof structure according to claim 14, wherein the two or more films of the laminated film have one first film, which is the one film, and at least one second film of the remaining films, and the first film moves relative to the second film, and
the moving device has a roll that winds the first film, one film of the at least one second film, or at least two films including the first film and one film of the at least one second film and a winding device that winds the first film, the one film of the at least one second film, or the at least two films including the first film and one film of the at least one second film on the roll by rotating the roll.

16. The soundproof structure according to claim 15, wherein the moving device further includes a gauge provided on the roll, and
a movement amount of the first film, the one film of the at least one second film, or the at least two films including the first film and one film of the at least one second film and a hole size of the through-hole are measured by the gauge.

17. An adjustment method of a soundproof structure, comprising:
adjusting a hole size of a through-hole, which is formed by overlapping of the one or more holes of the two or more films of the laminated film of the soundproof structure according to claim 1, by changing relative positions of the two or more films of the laminated film.

18. The adjustment method of a soundproof structure according to claim 17,
wherein the relative positions of the two or more films are changed by moving at least one film of the two or more films.

19. The adjustment method of a soundproof structure according to claim 17, wherein the two or more films of the laminated film have one first film, which is the one film, and at least one second film of the remaining films, and the first film moves relative to the second film, and the relative positions of the two or more films are changed by rotating a roll that winds the first film, one film of the at least one second film, or at least two films including the first film and one film of the at least one second film so that the first film, the one film of the at least one second film, or the at least two films including the first film and one film of the at least one second film are wound on the roll.

20. The adjustment method of a soundproof structure according to claim 19, wherein a movement amount of the first film, the one film of the at least one second film, or the at least two films including the first film and one film of the at least one second film and a size of the through-hole are measured by a gauge provided on the roll.

21. The soundproof structure according to claim 1, further comprising:

a soundproof cell configured from the laminated film and the two rigid frames, wherein a plurality of the soundproof cells are arranged in a two-dimensional manner.

* * * * *